US012050701B2

(12) United States Patent
Kounavis et al.

(10) Patent No.: US 12,050,701 B2
(45) Date of Patent: Jul. 30, 2024

(54) CRYPTOGRAPHIC ISOLATION OF MEMORY COMPARTMENTS IN A COMPUTING ENVIRONMENT

(71) Applicant: Intel Corporation, Santa Clara, CA (US)

(72) Inventors: Michael E. Kounavis, Portland, OR (US); Santosh Ghosh, Hillsboro, OR (US); Sergej Deutsch, Hillsboro, OR (US); Michael LeMay, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/833,515

(22) Filed: Jun. 6, 2022

(65) Prior Publication Data

US 2022/0300626 A1 Sep. 22, 2022

Related U.S. Application Data

(63) Continuation of application No. 16/723,977, filed on Dec. 20, 2019, now Pat. No. 11,354,423.
(Continued)

(51) Int. Cl.
*G06F 21/60* (2013.01)
*G06F 9/30* (2018.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
CPC ............... G06F 21/602; G06F 9/30043; G06F 9/30101; G06F 9/30178; G06F 9/321;
(Continued)

(56) References Cited

U.S. PATENT DOCUMENTS 6,570,989 B1  5/2003  Ohmori et al.
7,043,016 B2  5/2006  Roelse
(Continued)

FOREIGN PATENT DOCUMENTS

DE  102018125786 A1  5/2019
EP      2073430 A1  6/2009
(Continued)

OTHER PUBLICATIONS

USPTO Notice of Allowance in U.S. Appl. No. 16/709,612 dated Nov. 25, 2022 (10 pages).
(Continued)

*Primary Examiner* — Dant B Shaifer Harriman
*Assistant Examiner* — Phuc Pham
(74) *Attorney, Agent, or Firm* — Alliance IP, LLC

(57) ABSTRACT

Technologies disclosed herein provide cryptographic computing. An example method comprises executing a first instruction of a first software entity to receive a first input operand indicating a first key associated with a first memory compartment of a plurality of memory compartments stored in a first memory unit, and execute a cryptographic algorithm in a core of a processor to compute first encrypted contents based at least in part on the first key. Subsequent to computing the first encrypted contents in the core, the first encrypted contents are stored at a memory location in the first memory compartment of the first memory unit. More specific embodiments include, prior to storing the first encrypted contents at the memory location in the first memory compartment and subsequent to computing the first
(Continued)

encrypted contents in the core, moving the first encrypted contents into a level one (L1) cache outside a boundary of the core.

23 Claims, 22 Drawing Sheets

Related U.S. Application Data

(60) Provisional application No. 62/868,884, filed on Jun. 29, 2019.

(51) Int. Cl.

| | |
|---|---|
| *G06F 9/32* | (2018.01) |
| *G06F 9/455* | (2018.01) |
| *G06F 9/48* | (2006.01) |
| *G06F 9/50* | (2006.01) |
| *G06F 12/02* | (2006.01) |
| *G06F 12/06* | (2006.01) |
| *G06F 12/0811* | (2016.01) |
| *G06F 12/0875* | (2016.01) |
| *G06F 12/0897* | (2016.01) |
| *G06F 12/14* | (2006.01) |
| *G06F 21/12* | (2013.01) |
| *G06F 21/62* | (2013.01) |
| *G06F 21/72* | (2013.01) |
| *G06F 21/79* | (2013.01) |
| *H04L 9/06* | (2006.01) |
| *H04L 9/08* | (2006.01) |
| *H04L 9/14* | (2006.01) |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(58) Field of Classification Search
CPC ...... G06F 9/45558; G06F 9/48; G06F 9/5016; G06F 12/0207; G06F 12/0646; G06F 12/0811; G06F 12/0875; G06F 12/0897; G06F 12/1408; G06F 12/1458; G06F 12/1466; G06F 21/12; G06F 21/6227; G06F 21/72; G06F 21/79; H04L 9/0637; H04L 9/0822; H04L 9/0861; H04L 9/0869; H04L 9/0894; H04L 9/14
USPC ......................................................... 713/189
See application file for complete search history.

(56) References Cited

U.S. PATENT DOCUMENTS

| | | | |
|---|---|---|---|
| 7,254,718 B2 | 8/2007 | Kaminaga et al. | |
| 7,907,723 B2 | 3/2011 | Rubin | |
| 8,085,934 B1 | 12/2011 | Bhooma | |
| 8,675,868 B1 | 3/2014 | Yearsley et al. | |
| 8,798,263 B2 | 8/2014 | Pasini et al. | |
| 9,213,653 B2 | 12/2015 | Durham et al. | |
| 9,350,534 B1 | 5/2016 | Poo et al. | |
| 9,436,847 B2 | 9/2016 | Durham et al. | |
| 9,514,285 B2 | 12/2016 | Durham et al. | |
| 9,811,661 B1 | 11/2017 | Golovkin et al. | |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |
| 10,536,266 B2 | 1/2020 | Courtney | |
| 10,585,809 B2 | 3/2020 | Durham et al. | |
| 10,706,164 B2 | 7/2020 | LeMay et al. | |
| 10,769,272 B2 | 9/2020 | Durham et al. | |
| 10,860,709 B2 | 12/2020 | LeMay et al. | |
| 11,250,165 B2 | 2/2022 | LeMay et al. | |
| 11,308,225 B2 | 4/2022 | Kounavis et al. | |
| 11,321,469 B2 | 5/2022 | Kounavis et al. | |
| 11,354,423 B2 | 6/2022 | Kounavis et al. | |
| 11,403,234 B2 | 8/2022 | Durham et al. | |
| 11,416,624 B2 | 8/2022 | Durham et al. | |
| 11,575,504 B2 | 2/2023 | Durham et al. | |
| 11,580,035 B2 | 2/2023 | Durham et al. | |
| 11,580,234 B2 | 2/2023 | Kounavis et al. | |
| 11,620,391 B2 | 4/2023 | LeMay et al. | |
| 11,669,625 B2 | 6/2023 | Durham et al. | |
| 2002/0094081 A1 | 7/2002 | Medvinsky | |
| 2003/0091185 A1 | 5/2003 | Swindlehurst et al. | |
| 2003/0101362 A1 | 5/2003 | Dia | |
| 2003/0126349 A1 | 7/2003 | Nalawadi et al. | |
| 2003/0149869 A1 | 8/2003 | Gleichauf | |
| 2004/0123288 A1 | 6/2004 | Bennett et al. | |
| 2004/0215895 A1 | 10/2004 | Cypher | |
| 2004/0268057 A1 | 12/2004 | Landin et al. | |
| 2007/0152854 A1 | 7/2007 | Copley | |
| 2007/0201691 A1 | 8/2007 | Kumagaya | |
| 2008/0080708 A1 | 4/2008 | McAlister et al. | |
| 2008/0130895 A1 | 6/2008 | Jueneman et al. | |
| 2008/0140968 A1 | 6/2008 | Doshi et al. | |
| 2008/0263117 A1 | 10/2008 | Rose et al. | |
| 2009/0172393 A1 | 7/2009 | Tanik et al. | |
| 2009/0220071 A1 | 9/2009 | Gueron et al. | |
| 2009/0254774 A1 | 10/2009 | Chamdani et al. | |
| 2009/0282393 A1 | 11/2009 | Costa et al. | |
| 2010/0023707 A1 | 1/2010 | Hohmuth et al. | |
| 2011/0099429 A1 | 4/2011 | Varma et al. | |
| 2011/0161680 A1* | 6/2011 | Grube ................. | G06F 21/6218 713/193 |
| 2011/0296202 A1 | 12/2011 | Henry et al. | |
| 2012/0163453 A1 | 6/2012 | Horowitz | |
| 2012/0284461 A1 | 11/2012 | Larin et al. | |
| 2013/0275766 A1 | 10/2013 | Plainecassagne et al. | |
| 2014/0173293 A1 | 6/2014 | Kaplan | |
| 2014/0270159 A1 | 9/2014 | Youn et al. | |
| 2015/0234728 A1 | 8/2015 | Coleman et al. | |
| 2015/0244518 A1 | 8/2015 | Koo et al. | |
| 2015/0378941 A1 | 12/2015 | Rozas et al. | |
| 2016/0056954 A1 | 2/2016 | Lee et al. | |
| 2016/0092702 A1* | 3/2016 | Durham ................... | G06F 9/35 713/190 |
| 2016/0094552 A1* | 3/2016 | Durham ................... | G06F 21/00 713/171 |
| 2016/0104009 A1* | 4/2016 | Henry ................. | G06F 9/30189 713/190 |
| 2016/0154963 A1* | 6/2016 | Kumar .................. | G06F 21/602 713/189 |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0026171 A1* | 1/2017 | Lal ........................ | H04L 9/0822 |
| 2017/0063532 A1 | 3/2017 | Bhattacharyya et al. | |
| 2017/0177368 A1 | 6/2017 | DeHon et al. | |
| 2017/0285976 A1 | 10/2017 | Durham et al. | |
| 2018/0082057 A1 | 3/2018 | LeMay et al. | |
| 2018/0095812 A1 | 4/2018 | Deutsch et al. | |
| 2018/0095899 A1 | 4/2018 | Durham et al. | |
| 2018/0095906 A1 | 4/2018 | Doshi et al. | |
| 2018/0109508 A1 | 4/2018 | Wall et al. | |

(56) References Cited

U.S. PATENT DOCUMENTS

| | | | |
|---|---|---|---|
| 2018/0287785 A1 | 10/2018 | Pfannenschmidt et al. |
| 2018/0365069 A1 | 12/2018 | Nemiroff et al. |
| 2019/0026236 A1 | 1/2019 | Barnes |
| 2019/0042369 A1 | 2/2019 | Deutsch et al. |
| 2019/0042481 A1 | 2/2019 | Feghali et al. |
| 2019/0042734 A1 | 2/2019 | Kounavis et al. |
| 2019/0042766 A1 | 2/2019 | Pappachan et al. |
| 2019/0042796 A1 | 2/2019 | Bokern et al. |
| 2019/0042799 A1 | 2/2019 | Durham et al. |
| 2019/0044954 A1 | 2/2019 | Kounavis et al. |
| 2019/0045016 A1 | 2/2019 | Dewan et al. |
| 2019/0050558 A1 | 2/2019 | LeMay et al. |
| 2019/0095350 A1 | 3/2019 | Durham et al. |
| 2019/0097794 A1 | 3/2019 | Nix |
| 2019/0102567 A1 | 4/2019 | LeMay et al. |
| 2019/0102577 A1 | 4/2019 | Gueron et al. |
| 2019/0227951 A1 | 7/2019 | Durham et al. |
| 2019/0319781 A1 | 10/2019 | Chhabra et al. |
| 2019/0347445 A1 | 11/2019 | Chen |
| 2019/0354726 A1 | 11/2019 | Critelli et al. |
| 2020/0004953 A1 | 1/2020 | LeMay et al. |
| 2020/0007332 A1 | 1/2020 | Girkar et al. |
| 2020/0076585 A1 | 3/2020 | Sheppard et al. |
| 2020/0117810 A1 | 4/2020 | Kounavis et al. |
| 2020/0125501 A1 | 4/2020 | Durham et al. |
| 2020/0125502 A1 | 4/2020 | Durham et al. |
| 2020/0125742 A1 | 4/2020 | Kounavis et al. |
| 2020/0125769 A1 | 4/2020 | Kounavis et al. |
| 2020/0125770 A1 | 4/2020 | LeMay et al. |
| 2020/0134234 A1 | 4/2020 | LeMay et al. |
| 2020/0145187 A1 | 5/2020 | Kounavis et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0257827 A1 | 8/2020 | Kounavis et al. |
| 2020/0380140 A1 | 12/2020 | Medwed et al. |
| 2020/0382289 A1 | 12/2020 | Xue et al. |
| 2021/0004470 A1 | 1/2021 | Babic et al. |
| 2021/0058379 A1 | 2/2021 | Bursell et al. |
| 2021/0117340 A1 | 4/2021 | Trikalinou et al. |
| 2021/0117342 A1 | 4/2021 | Durham |
| 2021/0149825 A1 | 5/2021 | Durham et al. |
| 2021/0150040 A1 | 5/2021 | Durham et al. |
| 2021/0218547 A1 | 7/2021 | Weiler et al. |
| 2022/0019698 A1 | 1/2022 | Durham et al. |
| 2022/0138329 A1 | 5/2022 | Kounavis et al. |
| 2022/0382885 A1 | 12/2022 | Durham et al. |

FOREIGN PATENT DOCUMENTS

| | | | |
|---|---|---|---|
| EP | 3326102 A1 | 5/2018 |
| JP | 2009139899 A | 6/2009 |
| WO | 2017014885 A1 | 1/2017 |

OTHER PUBLICATIONS

USPTO Notice of Allowance in U.S. Appl. No. 16/724,026 dated Dec. 7, 2022 (14 pages).
USPTO Notice of Allowance in U.S. Appl. No. 16/709,612 dated Aug. 23, 2022 (18 pages).
USPTO Notice of Allowance in U.S. Appl. No. 16/722,707 dated Mar. 28, 2022 (10 pages).
USPTO Notice of Allowance in U.S. Appl. No. 16/723,468 dated Oct. 18, 2021 (10 pages).
USPTO Notice of Allowance in U.S. Appl. No. 16/723,927 dated Dec. 24, 2021 (13 pages).
USPTO Notice of Allowance in U.S. Appl. No. 16/724,026 dated Aug. 10, 2022 (9 pages).
USPTO Notice of Allowance in U.S. Appl. No. 16/724,105 dated Nov. 16, 2021 (9 pages).
USPTO Notice of Allowance in U.S. Appl. No. 16/724,105 dated Mar. 31, 2022 (8 pages).
USPTO Notice of Allowance in U.S. Appl. No. 16/740,359 dated Mar. 22, 2022 (9 pages).
USPTO Notice of Allowance in U.S. Appl. No. 16/776,467 dated Jul. 18, 2022 (10 pages).
USPTO Notice of Allowance in U.S. Appl. No. 17/134,406 dated Oct. 5, 2022 (10 pages).
USPTO Supplemental Notice of Allowance in U.S. Appl. No. 16/722,707 dated Apr. 8, 2022 (5 pages).
Watson, Robert N.M., et al., "An Introduction to CHERI", Technical Report UCAM-CL-TR-941, University of Cambridge Computer Labratory, Cambridge, United Kingdom, Sep. 2019, 43 pages.
Watson, Robert N.M., et al., "Cheri: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
Whelihan, David et al., "A Key-Centric Processor Architecture for Secure Computing," 2016 IEEE International Symposium on Hardware Oriented Security and Trust (HOST), 2016, pp. 173-178. (6 pages).
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).
Yang, Jun et al., "Improving Memory Encryption Performance in Secure Processors," IEEE Transactions on Computers, vol. 54, No. 5, May 2005 (11 pages).
Zhu, Ge et al., "Protection against indirect overflow attacks on pointers," Second IEEE International Information Assurance Workshop, 2004. Proceedings., 2004, pp. 97-106. (10 pages).
USPTO Non-Final Office Action in U.S. Appl. No. 16/723,871 dated Nov. 10, 2022 (11 pages).
USPTO Notice of Allowance in U.S. Appl. No. 16/776,467 dated Nov. 9, 2022 (8 pages).
USPTO Non-Final Office Action in U.S. Appl. No. 17/576,533 dated Feb. 7, 2023 (8 pages).
USPTO Notice of Allowance in U.S. Appl. No. 17/134,405 dated Jan. 31, 2023 (8 pages).
USPTO Restriction Requirement in U.S. Appl. No. 16/862,022 dated Feb. 2, 2023 (6 pages).
"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.
Andreatos et al., "A comparison of random number sequences for image encryption", Mathematical Methods in Science and Engineering, 2014, pp. 146-151 (Year: 2014) (7 pages).
Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).
Beaulieu, Ray et al., "Simon and Spec: Block Ciphers for the Internet of Things," National Security Agency, Jul. 2015 (15 pages).
Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).
Carr, Scott A. et al., "DataShield: Configurable Data Confidentiality and Integrity," Purdue University, Asia CCS, '17, Apr. 2-6, 2017, Abu Dhabi, United Arab Emirates (12 pages).

(56) References Cited

OTHER PUBLICATIONS

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.
Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in EP Patent Application No. 21195529.9, dated Mar. 1, 2022; 6 pages.
EPO; Extended European Search Report issued in EP Patent Application No. 21196104.0, dated Feb. 15, 2022; 10 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).
Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).
Liljestrand, Hans et al. "PACStack: an Authenticated Call Stack," Sep. 3, 2019, retrieved from https://arxiv.org/pdf/1905.10242.pdf, (20 pages).
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Pyo, Changwoo, "Encoding Function Pointers and Memory Arrangement Checking against Buffer Overflow Attack," In Proceedings of the 4th International Conference on Information and Communications Security (ICICS 2002) (12 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Final Office Action in U.S. Appl. No. 16/724,059 dated Sep. 2, 2022 (34 pages).
USPTO Non-Final Office Action in U.S. Appl. No. 16/709,612 dated Feb. 17, 2022 (17 pages).
USPTO Non-Final Office Action in U.S. Appl. No. 16/720,059 dated Jan. 21, 2022 (20 pages).
USPTO Non-Final Office Action in U.S. Appl. No. 16/722,342 dated Aug. 29, 2022 (14 pages).
USPTO Non-Final Office Action in U.S. Appl. No. 16/723,927 dated Jun. 8, 2021 (32 pages).
USPTO Non-Final Office Action in U.S. Appl. No. 16/724,105 dated Jul. 13, 2021 (10 page).
USPTO Non-Final Office Action in U.S. Appl. No. 16/740,359 dated Sep. 27, 2021 (8 pages).
USPTO Non-Final Office Action in U.S. Appl. No. 17/134,405 dated Aug. 1, 2022 (15 pages).
USPTO Non-Final Office Action in U.S. Appl. No. 17/134,406 dated Jan. 21, 2022 (11 pages).
EPO Communication Pursuant to Article 94(3) EPC in EP Application Serial No. 20181907.5-1218 dated Mar. 27, 2023 (6 pages).
USPTO Notice of Allowance in U.S. Appl. No. 16/722,342 dated Feb. 23, 2023 (7 pages).
U.S. Appl. No. 17/953,186; filed Sep. 26, 2022.
USPTO Final Office Action in U.S. Appl. No. 17/576,533 dated May 30, 2023 (9 pages).
USPTO Non-Final Office Action in U.S. Appl. No. 16/862,022 dated Jun. 20, 2023 (12 pages).
USPTO Notice of Allowance in U.S. Appl. No. 16/722,342 dated Jul. 13, 2023 (7 pages).
USPTO Notice of Allowance in U.S. Appl. No. 16/723,871 dated May 26, 2023 (7 pages).

* cited by examiner

CRYPTOGRAPHIC ISOLATION OF MEMORY COMPARTMENTS IN A COMPUTING ENVIRONMENT

CROSS REFERENCE TO RELATED APPLICATIONS

This application is a continuation (and claims the benefit of priority under 35 U.S.C. § 120) of U.S. application Ser. No. 16/723,977, filed Dec. 20, 2019 and entitled "Cryptographic Isolation of Memory Compartments In a Computing Environment" which application claims the benefit of priority to U.S. Provisional Application No. 62/868,884 filed Jun. 29, 2019 and entitled "Cryptographic Computing". The disclosures of the prior applications are considered part of and are hereby incorporated by reference in their entirety in the disclosure of this application.

TECHNICAL FIELD

This disclosure relates in general to the field of computer systems, more particularly, to cryptographic isolation of memory compartments in a computing environment.

BACKGROUND

Protecting memory in computer systems from software bugs and security vulnerabilities is a significant concern. A malicious actor may attempt to access data or code that it is not authorized to access. Encryption of data and code can help protect unauthorized accesses. Even if the data or code is stored in an encrypted state, it may still be vulnerable to attack if the malicious actor locates an encryption key to enable decryption of the encrypted data or code. In multi-tenant environments, shared resources can increase the risk of unauthorized access to data and code as security is dependent on logical separation of resources rather than physical separation.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
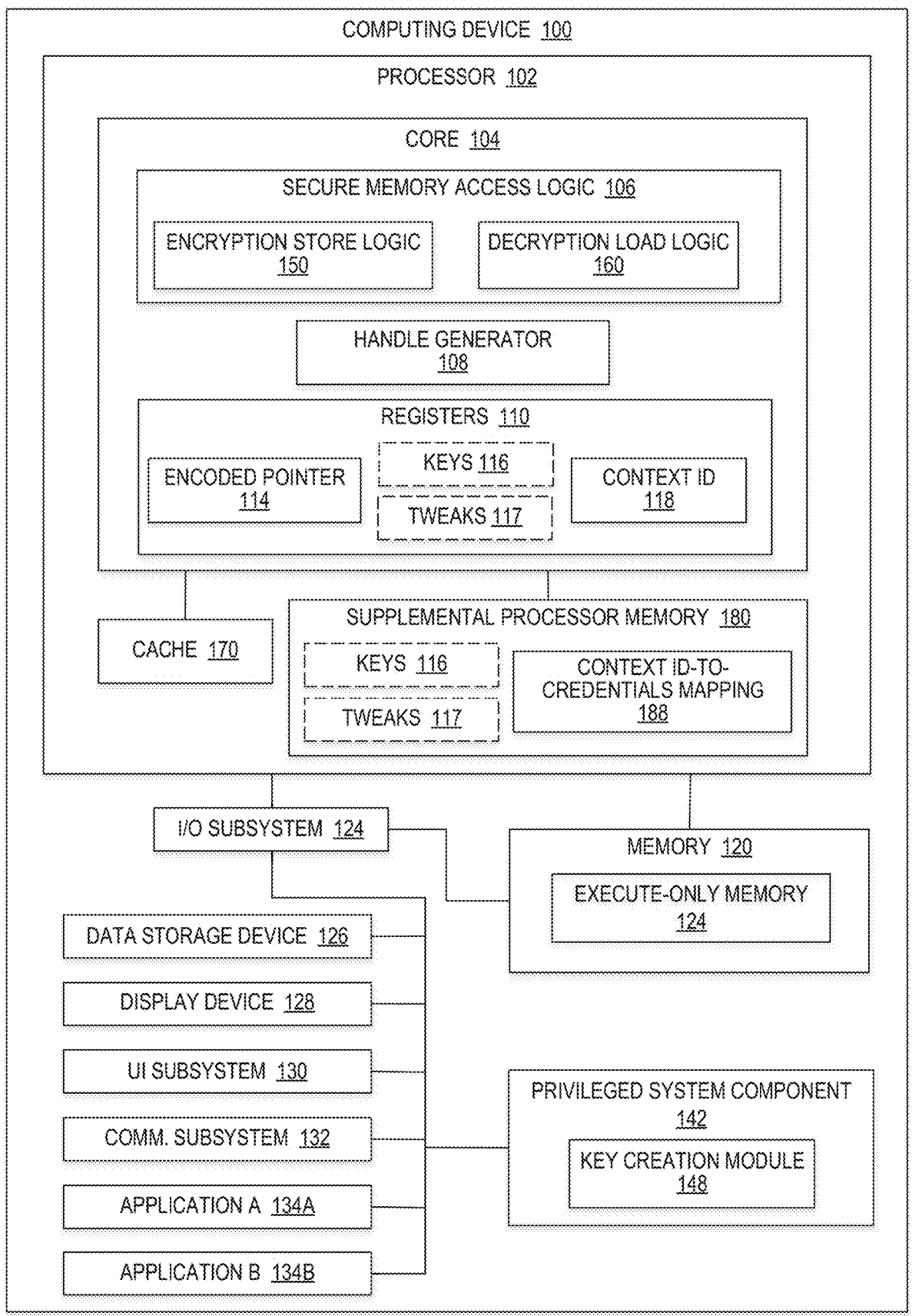
FIG. 1 is a simplified block diagram of an example computing device according to at least one embodiment.

The following disclosure provides various possible embodiments, or examples, for cryptographic isolation of memory compartments in a computing environment. As used herein, the term 'cryptographic isolation' is intended to mean isolation resulting from different areas of memory being encrypted with different keys and/or tweaks. Isolated memory compartments can be composed of data structures and/or code of virtual machines (VMs), applications, functions, or threads. Thus, isolation can be supported at arbitrary levels of granularity such as, for example, isolation between virtual machines, isolation between applications, isolation between functions, isolation between threads, or isolation between data structures (e.g., few byte structures).

Embodiments disclosed in this application include a plurality of keys that are maintained in a processor (e.g., central processing unit (CPU)) of a computing device. Each key is used to encrypt and decrypt data or code of a single isolated memory compartment within a core of the processor. Data or code is encrypted in the core before it leaves the core boundary and enters memory (e.g., L1 cache) outside the core. Similarly, encrypted data or code is decrypted within the core after it crosses being read from memory (e.g., L1 cache) into registers of the processor, and before being made accessible to an entity outside the core such as a virtual machine, application, function, or thread. Encryption and decryption operations of data or code associated with a particular memory compartment may be performed by a cryptographic algorithm using a key associated with that memory compartment.

In at least some embodiments, the cryptographic algorithm may also use a tweak as input. Generally, both 'keys' and 'tweaks' are intended to denote secrets used by an encryption or decryption process. A key may be a unique value, at least among the memory compartments being cryptographically isolated. Keys may be maintained in either processor registers or new processor memory (e.g., processor cache, content addressable memory (CAM), etc.) that is accessible through new instruction set extensions. A tweak can be derived from an encoded pointer and, in at least some scenarios, can also include context information associated with the memory compartment.

At least some embodiments disclosed in this application are related to pointer based data encryption and decryption in which a pointer to a memory location for data or code is encoded with a tag and/or other metadata and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak that includes the metadata. Other pointers can be encoded with a plaintext memory address (linear address) and metadata.

One or more embodiments can optionally include a binding between data or code encryption and a pointer to the data or code. Binding data or code encryption and the pointer can be achieved by encrypting the data or code at the memory location using a pointer-based tweak and secret data key. The pointer-based tweak for encrypting (and decrypting) the data or code can be derived from the encoded pointer and potentially additional context information. In one embodiment, a pointer-based tweak for data can be created based, at least in part, on an encrypted slice of the address in the encoded pointer and the metadata in the encoded pointer. In other embodiments, the memory address may be decrypted and decoded, and combined with metadata encoded in the pointer and/or additional context information, to create the pointer-based tweak for encrypting/decrypting the data. In further embodiments, a plaintext memory address (linear address) encoded in a pointer can be used as the pointer-based data tweak, potentially along with metadata encoded in the pointer. In at least some embodiments, context information stored separately from the pointer may also be included in the pointer-based data tweak.

For purposes of illustrating the several embodiments of cryptographic isolation of memory compartments, it is important to first understand the operations and activities associated with data protection and memory safety. Accordingly, the following foundational information may be viewed as a basis from which the present disclosure may be properly explained.

Current computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as function as a service (FaaS) workloads or object bounds information).

Cryptographic isolation of memory compartments, as disclosed herein, can resolve many of the aforementioned issues (and more). Cryptographic isolation may make redundant the legacy modes of process separation, user space, and kernel with a fundamentally new fine-grain protection model. With cryptographic isolation of memory compartments, protections are cryptographic, with processors and accelerators alike utilizing secret keys (and optionally tweaks) and ciphers to provide access control and separation at increasingly finer granularities. Indeed, embodiments herein support isolated memory compartments as small as a one-byte object to as large as data and code for an entire virtual machine. Thus, although embodiments allow virtual machine isolation, the cryptographic isolation disclosed herein may result in individual applications or functions becoming the boundary, allowing address spaces to be shared via pointers. In at least some embodiments, the pointers can be cryptographically encoded or non-cryptographically encoded. Additionally, since embodiments enable isolation and controlled access down to individual data objects of just one or more bytes in size, embodiments herein offer multi-tenancy support at significantly greater granularity and performance levels. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported. Also, costs of the microarchitecture pipeline are minimized since the operations happen within the core. One or more cryptographic isolation embodiments herein may also be referred to as "Instruction Guard eXtensions (IGX)." This nomenclature, however, is not intended to be limiting and merely offers one possible example of nomenclature that may be used to refer to one or more embodiments.

Cryptographic isolation embodiments disclosed herein may also leverage the concept of a cryptographic addressing layer where the processor encrypts at least a portion of software allocated memory addresses (linear/virtual address space, also referred to as "pointers") based on implicit and explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

In cryptographic isolation, where data security is fundamentally linked to cryptographic memory addressing, processing and fine grain cryptographic access controls to data are important. Cryptographic computing transforms all compute vectors from the CPU to GPU, accelerators to FPGAs, etc. Capabilities may thus become entwined in the cryptographic operations to provide granular access control to data objects while preventing buffer overflows, type confusion and temporal (e.g. use-after-free) vulnerabilities at every level of the system. Cryptographic code may execute natively, safely, and without the need for interpreters or managed runtimes to provide memory and type safety. Memory may move from inaccessible domains and containers to globally shared memory models where data is cryptographically isolated with configurable accessibility based on cryptographic access control mechanisms. Thus, gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multitenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, PRINCE or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

FIG. 1 is a simplified block diagram of an example computing device 100 for implementing cryptographic isolation of memory compartments using secure memory access logic according to at least one embodiment of the present disclosure. In the example shown, the computing device 100 includes a processor 102 having a core 104 and memory components, such as a cache 170 (e.g., L1 cache, L2 cache) and supplemental processor memory 180. The core 104 comprises secure memory access logic 106 including encryption store logic 150 to encrypt data based on various keys and/or tweaks, and decryption load logic 160 to decrypt data based on the keys and/or tweaks. The core 104 may also include a handle generator 108 for generating handles for keys. The encryption store logic 150, decryption load logic 160, and handle generator 190 will be described in more detail below.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 and a context identifier 118. The encoded pointer may be cryptographically encoded or non-cryptographically encoded. An encoded pointer is encoded with some metadata. If the encoded pointer is cryptographically encoded, at least a portion (or slice) of the address bits is encrypted. In certain embodiments (e.g., context-agnostic processors), keys 116 used for encryption and decryption may be stored in registers 110. In other embodiments (e.g., context-aware processors), keys may be stored in other memory, such as supplemental processor memory 180.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). Memory operands of control transfer instructions may specify a location in memory at which the destination address for the control transfer is stored.

The secure memory access logic 106 is executable by the computing device 100 to provide security for encoded pointers "inline," e.g., during execution of a program (such as a user space software application 134A or 134B) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory. In one or more embodiments herein, new instructions to load encrypted data or code using an encoded pointer and perform decryption within the core, or to perform encryption of data or code within the core and store the encrypted data or core (e.g., "IGXMOV" instruction) will be further described herein.

However, the pointer encoding/decoding technology disclosed herein is not limited to load/store instructions. For example, control transfer instructions such as call and jump instructions can be adapted to handle encoded pointers that perform encryption and decryption within the core in a similar manner as described herein with respect to new load/store instructions (e.g., IGXMOV), wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an encoded pointer (e.g. arithmetic operations such as ADD, SUB, MUL, AND, OR, XOR, etc. may have a source/destination memory reference in the form of an encoded pointer and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 106 includes encryption store logic 150 and decryption load logic 160. Secure memory access logic 106 may also include address encoding logic to encode a pointer, which may include encrypting a portion (or slice) of a linear address and storing metadata in non-canonical bits of the pointer. Secure memory access logic 106 may further include address decoding logic to decode a pointer to obtain a linear address. Illustratively, the address decoding logic is embodied in encryption store logic 150 and decryption load logic 160, but may be embodied in other processor instructions, or as a separate instruction or series of instructions, or as higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 perform cryptographic operations on data to be stored at a memory location referenced by encoded pointer 114 or obtained from a memory location referenced by encoded pointer 114. In one or more embodiments, the cryptographic operations may use at least a portion of the encoded pointer 114 (or the linear address generated from the encoded pointer), a secret key (e.g., keys 116), and optionally a tweak, in order to secure the data at the memory location referenced by the encoded pointer 114 by binding the data encryption to the encoded pointer.

The example encoded pointer 114 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a machine specific register (MSR)), or another memory location that is readable by the processor 102. In some embodiments, the secret keys 116 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be dedicated to storage of information related to cryptographic isolation such as keys and potentially tweaks, credentials, and/or context IDs.

In other embodiments, the secret keys 116 used to secure a cryptographically encoded pointer, data, and/or code can be stored in another memory location, such as in firmware, in a secure portion of the data storage device 126 or another data storage device, or another form of memory suitable for performing the functions described herein. In some embodiments, the secret keys 116 may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an encoded pointer and the referenced data and/or code are secured using secret keys, and then later resumes, the secret keys may need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 142).

It should be noted that embodiments described herein allow for any number of secret keys and/or tweaks to be used for memory compartments associated with a processor. To isolate a particular type of memory compartment (e.g., data and code of any context, one or more data structures of any context, one or more code segments of any context), a different key may be used for each memory compartment. For example, to isolate virtual machines a different key may be used for each virtual machine, to isolate applications within a higher level context (e.g., virtual machine), a different key may be used for each application in that higher level context. To isolate functions within a higher level context (e.g., application, virtual machine), a different key may be used for each function in that higher level context. To isolate threads within a higher level context (e.g., application, virtual machine, function), a different key may be used for each thread in that higher level context. To isolate code segments within a particular context (e.g., virtual machine, application, function, or thread), a different key may be used for each code segment in that particular context. To isolate data structures within a particular context (e.g., application, virtual machine, function, thread), a different key may be used for each data structure in that particular context. Alternatively, the same key could be used for each compartment of a particular type of memory compartment, but the key could paired with a different tweak for each instance of that type of memory compartment to enforce isolation of the compartment instances. For example, virtual machines in a computing device may be cryptographically isolated using the same key but different tweaks, applications in a virtual machine may be cryptographically isolated using the same key but different tweaks, functions and/or threads in an application or virtual machine may be cryptographically isolated using the same key but different tweaks, data in any context may be isolated using the same key but different tweaks.

In further nonlimiting examples, keys and/or tweaks may be used to cryptographically isolate selected memory compartments for a particular context. For example, consider a first key and a second key generated for a first application and a second application, respectively, of a virtual machine. The data and code of a first application may be encrypted based on the first key. For the second application, the code may be encrypted based on the second key, but the data may be encrypted based on the second key and a tweak, or based on the second key and a different tweak for each data structure (e.g., as little as one byte) that is encrypted, resulting in multiple isolated memory compartments of data within the second application. Alternatively, a third key or multiple other keys may be used to encrypt the data of the second application. For functions and threads in the second application, the data used by a function (or thread) may be encrypted using the second key, using the second key and a tweak (thus cryptographically isolating the data within the application), or using the second key and a different tweak for each data structure that is encrypted (thus cryptographically isolating the data within the function). A function or thread can also encrypt the data it accesses by establishing its own credentials, obtaining its own key (or keys), and using the key (or keys) and/or tweaks to cryptographically isolate the memory compartments of the data it uses. Generally, keys, tweaks, or any suitable combination thereof may be used to cryptographically isolate memory compartments.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data or code.

On (or during) a memory allocation operation (e.g., a "malloc"), a range of memory for a buffer is allocated, a pointer is returned along with the metadata (e.g., one or more of range, permission metadata, size (power), memory allocation size, type, location, ownership, version, tag, privilege level, crypto context ID, etc.). In one example, the memory allocation operation may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation operation logic may be embodied in the privileged system component 142. The memory allocation operation causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using the secret key (e.g., keys 116) and the address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 106 enables the computing device 100 to provide encoded pointer security against buffer overflow attacks and similar exploits.

Embodiments of the encoded pointer security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed encoded pointer security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein. At least some embodiments disclosed herein can be implemented without using new program instructions and accordingly, without the need for recompiling legacy code.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106.

The computing device 100 also includes memory 122, an input/output subsystem 124, a data storage device 126, a display device 128, a user interface (UI) subsystem 130, a communication subsystem 132, at least one user space application 134A, and the privileged system component 142 (which, illustratively, includes key creation module 148). In this example, computing device 100 also includes user space application 134B, which will be further referenced herein to illustrate cryptographic isolation between applications 134A and 134B. However, cryptographic isolation can be implemented among any combination of memory compartments, which may or may not include application isolation. The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside core 104 and outside the core boundary. For example, registers 110 may be included within the core 104 and may be used to store encoded pointers (e.g., 114), secret keys 116 for encryption and decryption of data or code, and a context ID 118 associated with credentials of an application currently executing. Processor 102 may also include cache 170, which may be L1 and/or L2 cache for example, where data is stored when it is retrieved from memory 122 in anticipation of being fetched by processor 102.

The processor may also include supplemental processor memory 180 outside the core boundary. Supplemental processor memory 180 may be a dedicated cache that is not accessible by software and may be used when the processor is context-aware. A processor is considered 'context-aware' when the processor 102 can authenticate credentials of a context. A 'context' as used herein is intended to mean a software entity such as a virtual machine, an application, a function, or a thread. When the processor 102 is context-aware, supplemental processor memory 180 may store keys 116 that are generated or obtained by the processor and thus, can hide the keys from software. In some context-aware embodiments, supplemental processor memory 180 may also store tweaks 117, or context information to be used for generating tweaks. In other context-aware embodiments, however, tweaks may be managed by software. Alternatively, a processor may be context-agnostic. If processor 102 is context-agnostic, then the processor may not be capable of authenticating credentials of a context. Accordingly, keys 116 may be managed by software. In some embodiments, tweaks 117 may also be managed by software.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory. In this embodiment. In a third embodiment, the keys may be managed by a processor, while the tweaks may be managed by software.

Supplemental processor memory 180 may additionally store a context ID-to-credentials mapping 188. The context ID-to-credentials mapping 188 can include credentials of various contexts (e.g., virtual machines, applications, functions, or threads) mapped to a context ID for each of the credentials. This mapping 188 can be used to verify credentials presented by a context to the processor, when the context is running.

The memory 122 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 122 comprises one or more memory modules, such as dual in-line memory modules (DIMMs). In some embodiments, the memory 122 may be located on one or more integrated circuit chips that are distinct from an integrated circuit chip comprising processor 102 or may be located on the same integrated circuit chip as the processor 102. Memory 122 may comprise any suitable type of memory and is not limited to a particular speed or technology of memory in various embodiments.

In operation, the memory 122 may store various data and software used during operation of the computing device 100, as well as operating systems, applications, programs, libraries, and drivers. Memory 122 may store data and/or sequences of instructions that are executed by the processor 102.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications, such as applications 134A and 134B, and the privileged system component 142. The user space applications 134A and 134B may be embodied as any computer application (e.g., software, firmware, hardware, or a combination thereof) that interacts directly or indirectly with an end user via, for example, the display device 128 or the UI subsystem 130. Some examples of user space applications 134A and 134B include word processing programs, document viewers/readers, web browsers, electronic mail programs, messaging services, computer games, camera and video applications, etc. Among other things, the privileged system component 142 facilitates the communication between the user space applications 134A and 134B and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes a key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116(1)-116(N) (e.g., secret address keys and secret data keys) and writes them to a register or registers to which the processor 102 has read access (e.g., a special purpose register). To create a secret key, the key creation module 148 may execute, for example, a random number generator or another algorithm capable of generating a secret key that can perform the functions described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans). This can include keeping the key secret from the memory compartment for which the key is used to perform encryption and decryption of data and/or code.

Figure 2:
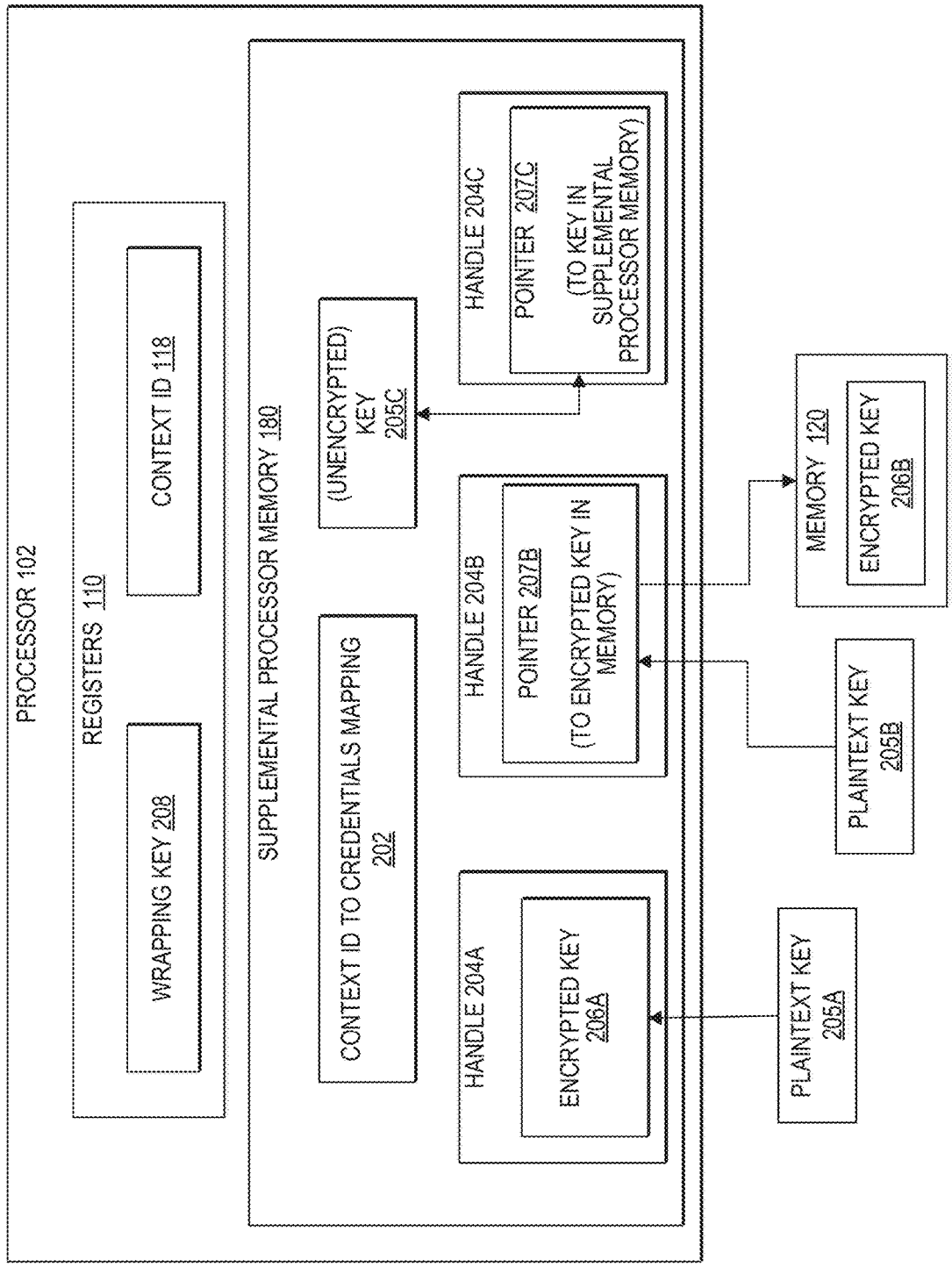
FIG. 2 is a simplified block diagram illustrating a system for protecting keys to be used in cryptographic instruction according to at least one embodiment.

FIG. 2 illustrates additional possible details of certain components of computing device 100 according to at least one embodiment. In particular, a system for protecting keys to be used in cryptographic instructions in accordance with certain embodiments is illustrated in FIG. 2. Processor 102 may implement a handle generation instruction to generate a handle, which may be embodied as any one of handles 204A, 204B, or 204C depending on the particular implementation. As shown in FIG. 2, handles 204A, 204B, and 204C are generated based on a plaintext (i.e., unencrypted) key 205A, 205B, and 205C, respectively, to be used in decryption and encryption instructions executed by the processor 102. For example, handle 204A comprises an encrypted key 206A, handle 204B comprises a pointer 207B (or reference) to a location in memory 120 where an encrypted key 206B is stored, and handle 204C comprises a pointer 207C (or reference) to a location in the supplemental processor memory 180 (or any other processor memory that is not directly accessible by software) where unencrypted key 205C is stored.

The handle generation instruction may invoke handle generator 108 to generate a handle (generally referenced herein as 'handle 204'). In various embodiments, a plaintext key (e.g., 205A, 205B, 205C), which may be used to generate an encrypted key (e.g., 206A, 206B), is provided by the processor. In other embodiments, the plaintext key is provided by an external secure processor performing key management activities. In yet another embodiment, the plaintext key is provided by the calling application (e.g., placed into a register or a location in memory 120) or other suitable entity. In at least one embodiment, the location of the handle 204 (or the key itself) may be implicit input to the instruction such that the processor is configured to store the handle to the same memory location (e.g., in supplemental processor memory 180) or register each time the handle generation instruction is called. In other embodiments, the location of the handle 204 (or the key itself) may be a parameter of the handle generation instruction such that the processor 102 is configured to store the handle to the same memory location (e.g., in memory 120) or register each time the handle generation instruction is called. In some embodiments, the handle 204 has a length of 384 bits, while in other embodiments, the handle 204 can have any other suitable length (e.g., 64 bits, 128 bits, 256 bits, etc.), such as the length of the encrypted key (e.g., 206A) or pointer (e.g., 207B, 207C) it comprises for example. The plaintext key (e.g., 205A, 205B, 205C) and the encrypted key (e.g., 206A, 206B) may also have any suitable length.

During execution of the handle generation instruction, the plaintext key (e.g., 205A, 205B) may be encrypted based on a wrapping key 208 that is stored within a register or other memory (e.g., supplemental processor memory 180) that is internal to the processor 102, such that software applications utilizing the handle generation instruction do not have direct access to the wrapping key 208 (although in some situations, a privileged software application may be able to access the wrapping key). A generated handle 204 may be stored by the processor 102 in a register (not shown) accessible to the calling software application or may be written to a memory location (e.g., supplemental processor memory 180). If the handle is output into a register by the processor 102, the calling software application may store the generated handle in memory 120 (which in some embodiments may be a system memory accessible by any number of different applications), which may allow for scalable protection of numerous handles 204 generated for various software applications.

The handle may be formatted in any suitable manner. In some embodiments (e.g., handle 204A), the handle comprises only the encrypted key 206A such that the handle is the encrypted key. In other embodiments, the handle comprises multiple encrypted keys (e.g., code key and data key), for example, if different keys are used to cryptographically isolate different memory compartments within an application. In further embodiments, the handle comprises a message authentication code (MAC) to enable integrity checks on the encrypted key in the handle. Also, a handle may comprise any other suitable information based on particular needs and implementations. In yet other embodiments, such handle 204B, the handle comprises a pointer to a location in memory 120 where the encrypted key 206B is stored. In yet further embodiments, such as handle 204C, the handle comprises a pointer to a location in processor memory that is not directly accessible by software, and at which the unencrypted key 205C is stored. In at least one embodiment, pointer 207B and/or pointer 207C may be encoded with a memory address and context information (e.g., tag, version number, size/power metadata, etc.). At least a portion of the encoded pointers may be encrypted, as previously described herein. For example, a portion or slice (e.g., 25 bits of 64-bit register, etc.) of a memory address encoded in a pointer may be encrypted.

It should be noted that some of the examples shown in FIG. 2 (e.g., 204A, 204B) illustrate embodiments in which keys that are used to achieve the cryptographic isolation of memory compartments are wrapped (i.e., further encrypted). In other embodiments, however, cryptographic isolation of memory compartments may be achieved using keys that are not wrapped (i.e., not encrypted). Instead the plaintext version of the keys may be stored and accessed without additional encryption to hide the value of the key. Furthermore, although the handle 204C contains pointer 207C to a location in supplemental processor memory 180 containing the unencrypted key 205C, it should be apparent that a further layer of protection may be applied by encrypting unencrypted key 205C, such that pointer 207C references an encrypted version of key 205C, which is stored in supplemental processor memory 180 or any other processor memory that is not directly accessible by software.

FIG. 2 also illustrates a system for allowing a processor that is "context-aware" to recognize an application as unique and associate an application identifier (also referred to herein as "context ID") with the credentials so that the processor knows which application is running. The term "context" as used herein is intended to mean any software entity that can use a plurality of keys to support cryptographic isolation between memory areas or memory compartments it accesses. Examples of a context may include, but are not necessarily limited to a virtual machine, software application, function, or thread. A virtual machine is an emulation of a computer system (or a software computer system). A process virtual machine can be designed to execute computer programs in a platform-independent environment. A system virtual machine can be designed to provide functionality needed to execute an entire operating system, where a hypervisor can share and manage hardware for multiple separate environments. A function may be defined as a block of executable code that has one entry point, performs at least one task, and may or may not return a value to a calling program. A thread may be defined as a unit of execution within a process and a multi-threaded process may have multiple thread running concurrently in the same address space.

In at least one embodiment, an application presents its credentials to a processor. The processor generates or otherwise obtains a context ID as a unique identifier for the application and associates the context ID with the presented credentials. For example, a context ID to credentials mapping table 202 may be stored in a memory unit that only the processor can access, such as supplemental processor memory 180. The context ID to credentials mapping 202 may use any suitable mapping, marking, or linking technique (e.g., pointers, indexes, file names, relational databases, hash table, etc.), or any other technique that establishes a relation, connection, or link between the 'mapped' items. In addition, the processor may set a control register, such as a model specific register (MSR), with the context ID when the credentials are initially presented. This provides an indication of which application is currently running so that an application can use its credentials to verify that the processor has the correct identifier set when the application makes subsequent requests to the processor for application-specific keys and other information and/or action.

Figure 3:
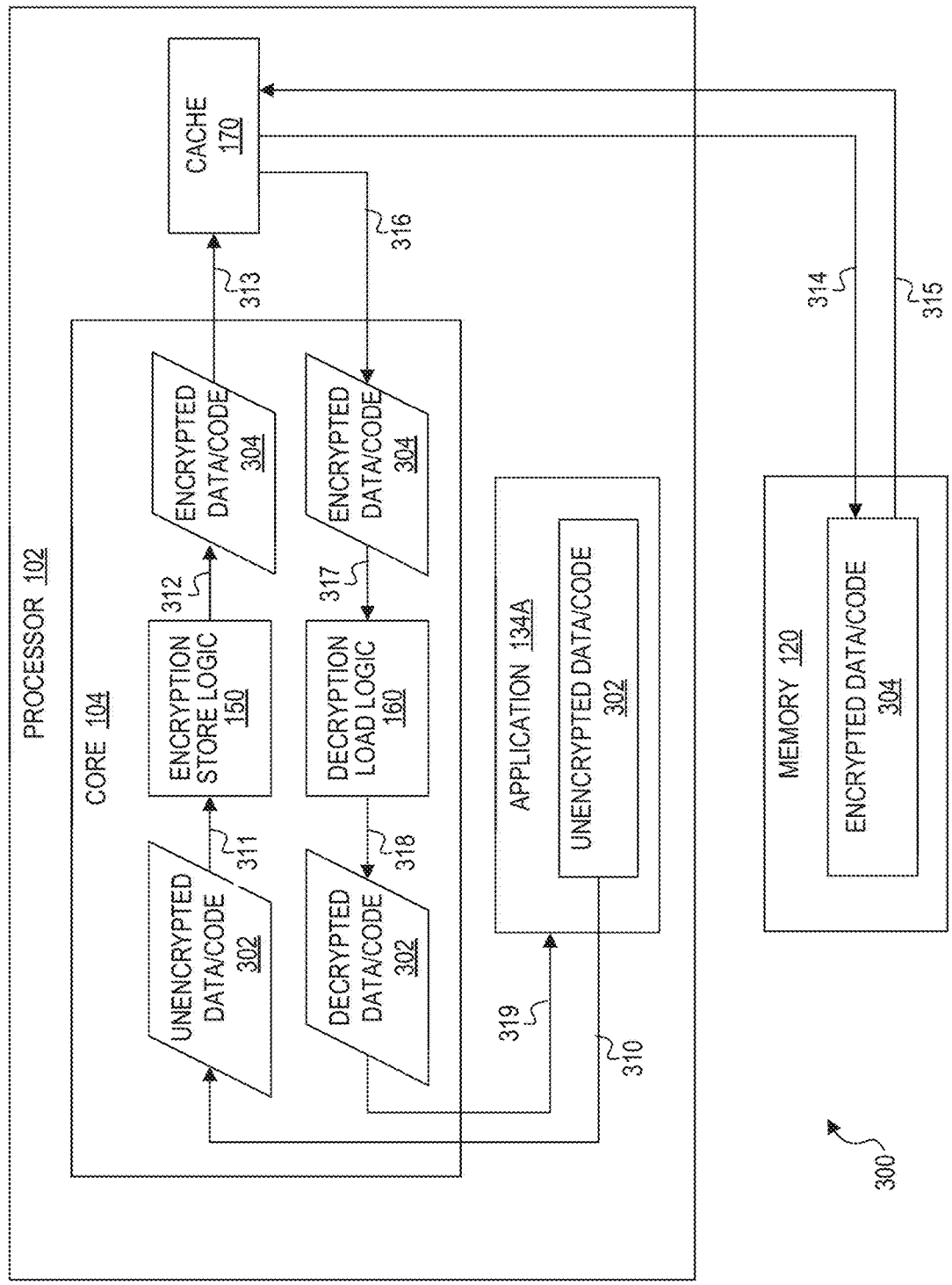
FIG. 3 illustrates a flow of cryptographically isolated data or code according to at least one embodiment.

FIG. 3 is a simplified flow diagram of data flow 300 through various components of computing device 100 according to at least one embodiment. The data flow 300 assumes either the processor 102 is context-agnostic and has obtained or generated a key, or that the processor 102 is context-aware and application 134A has established its credentials and obtained a key from the processor 102. The components involved in the data flow 300 shown in FIG. 3 include the processor 102 and its core 104, cache 170 (such as L1 cache), memory 120, and application 134A.

Initially, application 134A may be instantiated as a process on processor 102, and may have unencrypted data and/or code 302 to be encrypted. Application 134A may execute an instruction to encrypt and move (e.g., store, write) the unencrypted data/code 302. At 310, unencrypted data/code 302 is passed to the core 104. For example, the unencrypted data/code 302 may be stored in a register. At 311, the unencrypted data/code 302 is accessed by encryption store logic 150, which performs a cryptographic algorithm on the unencrypted data/code 302 based at least in part on a key obtained or generated by application 134A. In one or more embodiments, a key handle (e.g., comprising encrypted key, pointer to encrypted key, or pointer to key) may be passed to core 104 by application 134A as an operand in the encrypt and move instruction.

At 312, encryption store logic 150 generates encrypted data/code 304 as a result of performing the cryptographic algorithm. Once the encrypted data/code 304 is generated, at 313, it is passed out of core 104. In the example data flow 300 of FIG. 3, the encrypted data/code 304 may be passed to cache 170 (e.g., L1 cache in processor 102). At 314, the encrypted data/code 304 may be stored in memory 120 (e.g., main memory of computing device 100). In other embodiments, the encrypted data/code 304 may bypass L1 cache and be stored directly into memory 120.

When application 134A needs to use or execute the data or code stored in memory 120, it may execute an instruction to encrypt and move (e.g., load, read) the encrypted data/code 304. At 315, encrypted data/code 304 is passed to the cache 170. At 316, the encrypted data/code 304 is passed to core 104. At 317, the encrypted data/code 304 is accessed by decryption load logic 160, which performs the cryptographic algorithm on the encrypted data/code 304 based at least in part on the same key obtained or generated by application 134A. In one or more embodiments, the handle to the key may be passed to core 104 by application 134A as an operand in the decrypt and move instruction.

At 318, decryption load logic 160 generates unencrypted (or decrypted) data/code 302 as a result of performing the cryptographic algorithm on the encrypted data/code. Once the unencrypted data/code 302 is generated, at 319, it is passed out of core 104. For example, the unencrypted data/code 302 may be made available to application 134A by being stored in a register. Thus, application 134A can perform operations on and manipulate unencrypted data or can execute unencrypted code. Once the application 134A is finished performing operations on the data (or executing the code), it can execute another encrypt and move instruction to re-encrypt the data or code and store it in memory 120 again.

Figure 4:
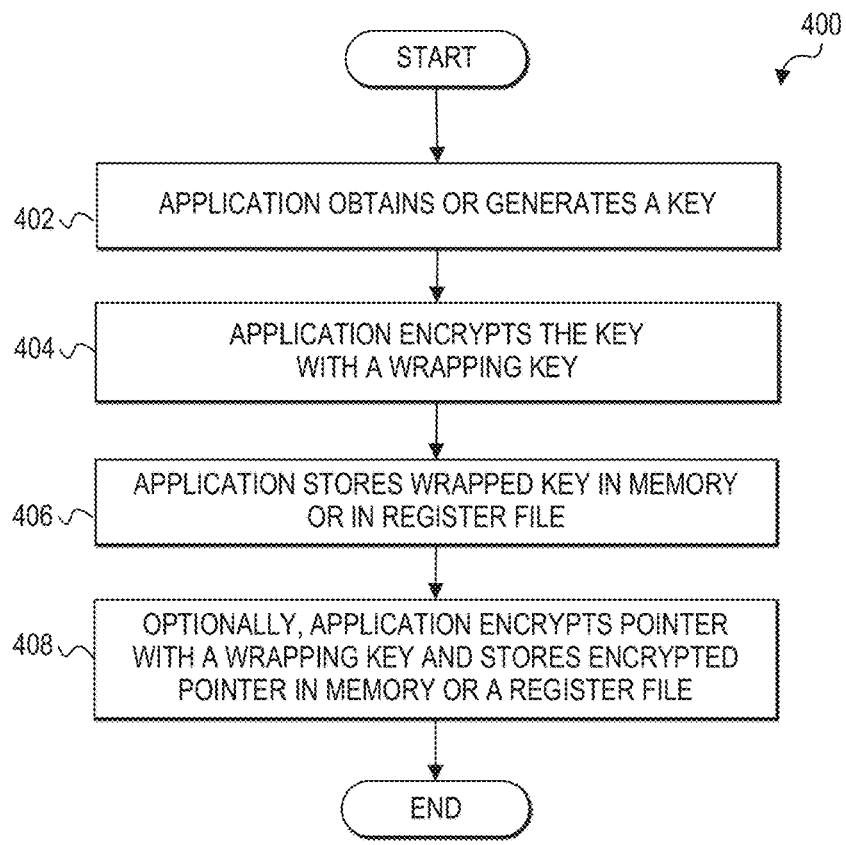
FIG. 4 is a simplified flow diagram illustrating possible operations that may occur when an application runs on a context-agnostic central processing unit (CPU) according to an embodiment.

Turning to FIG. 4, FIG. 4 is a simplified flow diagram illustrating an example process 400 for initializing a key to be used to cryptographically isolate a memory compartment according to or more embodiments. The process 400 includes one or more possible instructions of a context (e.g., application 134A or 134B, virtual machine, function, or thread) being executed by a context-agnostic processor (e.g., processor 102) that allow the context to initialize a key. If the processor is context-agnostic, then once a key is initialized, it is used by a subsequent encrypted load or store instructions. The context (e.g., virtual machine, application, function, thread, etc.) may explicitly reference the key and/or tweak in an encrypted load or store instruction for a context-agnostic processor. Although process 400 could be performed by any context depending upon the particular type of cryptographic isolation that is desired, for ease of illustration, process 400 will be described with reference to a particular context, i.e., an application.

Process 400 may begin after an application begins to execute. At 402, the application obtains or generates a key. For example, the application may execute an instruction to generate a random number that is unique across the memory compartments being cryptographically isolated. The random number may be generated from an entropy source in some embodiments. In other embodiments, the application may execute an instruction that results in accessing a separate component that generates the key for the application. The separate component(s) may be external to processor 102 or external to computing device 100 (e.g., in a cloud computing environment, in a local area network, etc.).

At 404, the key may be encrypted with a first wrapping key, resulting in a "wrapped key." The encryption may be achieved by performing a cryptographic algorithm based on the first wrapping key, and possibly based on a tweak. At 406, the wrapped key may be stored in memory (e.g., 120) or in a register file. A register file can be a single register (e.g., one of registers 110) or a set of registers in the processor.

Optionally, at 408, the application may encrypt a pointer, or parts of a pointer (e.g., a slice of a linear address, context information encoded in the pointer, etc.) with a second wrapping key and store the cryptographically encoded pointer in memory (e.g., 120) or in a register file.

FIGS. 5-8 illustrated simplified flow diagrams illustrating example processes for establishing and verifying credentials of an application and for initializing a key used to be used to cryptographically isolate a memory compartment according to or more embodiments. The processes illustrated in FIGS. 5-8 include one or more possible instructions of a context (e.g., application 134A or 134B, virtual machine, function, or thread) being executed by a context-aware processor (e.g., processor 102). In a context-aware processor, some processor state (e.g., a control register such as a Model-Specific Register (MSR)) holds information about the currently running context (e.g., virtual machine, application, function, thread, etc.). In addition, once a key is initialized by a context-aware processor, the context can implicitly reference the key and/or tweaks used when a cryptographic memory access instruction, such as a cryptographic load or store instruction, for a context-aware processor. For example, implicitly referencing a key or tweak could be achieved by having no encryption key or tweak present as an input operand to a cryptographic memory access instruction for a context-aware processor. Although processes in FIGS. 5-8 could be performed by any context depending upon the particular type of cryptographic isolation that is implemented, for ease of illustration, processes in FIGS. 5-8 will be described with reference to a particular context, i.e., an application.

Figure 5:
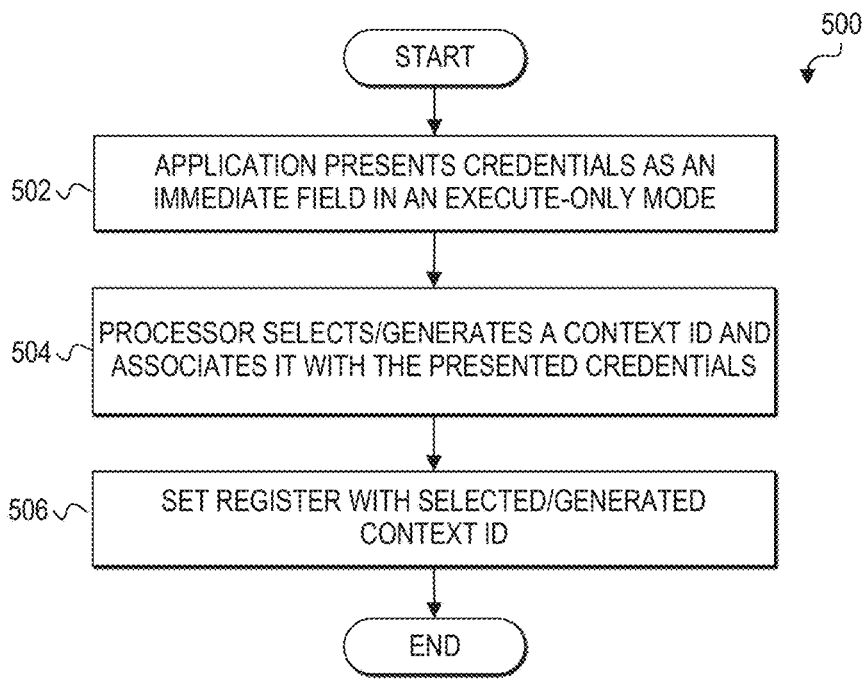
FIG. 5 is a simplified flow diagram illustrating possible operations that may occur when an application runs on a context-aware central processing unit (CPU) according to an embodiment.

FIG. 5 illustrates operations of a process 500 for establishing the credentials of an application once the application is initiated. Process 500 may begin after an application begins to execute. At 502, the application presents its credentials to the context-aware processor. In one example, the credentials may be presented as an immediate field of a new instruction to establish credentials in an execute-only mode. When credentials are communicated to the processor in an immediate field (rather than being retrieved from memory), the application's credentials are known only to the application. Furthermore, if the appropriate pages containing the credentials as an immediate operand are marked as execute-only, then these pages are not readable as data. Thus, the credentials can be accessed and used only by the application. In other embodiments, however, the credentials may be stored in memory and dynamically retrieved when the new instruction to establish credentials is executed.

Any suitable form of credentials may be used based on particular needs and implementations. In one possible example the credentials can include asymmetric keys, and specifically public-private key pairs. Once the credentials are established, they can be carried by the encrypted memory access instructions in the form of immediate fields. Thus, the credentials can be presented by instructions at process management time and only need be compared against credentials stored inside the CPU boundary (e.g., in an authentication engine), instead of being verified cryptographically. As a result, the execution of relatively expensive cryptographic algorithms can be avoided as a simple matching operation can be relatively faster and significantly less expensive than algorithms such as RSA or ECC-DSA. However, it should be noted that any other suitable form of credentials could be implemented in one or more embodiments.

At 504, the processor selects, generates, or otherwise obtains a context ID for the context (e.g., virtual machine, application, function, thread, etc.). The processor also associates the context ID with the presented credentials from the application. In at least one embodiment, the context ID can be mapped to the presented credentials in a new cache or CAM (e.g., supplemental processor memory 180) that cannot be accessed by the application. For example, a context ID to credentials mapping table or other storage structure (e.g., 202) may be stored in the new cache or CAM to keep track of all the context IDs and associated credentials or applications executing on the processor.

At 506, the processor provides an indication that the application associated with the presented credentials is currently running. For example, the processor may set a control register (e.g., an MSR) with the context ID of the application. The context ID may be set whenever the application executes.

This new instruction to establish the credentials and set a context ID for an application may be performed initially after an application begins executing. In other scenarios, however, the same (or a different) instruction to establish credentials may be executed. This instruction may be referred herein as "SetContextID". For example, when context switching occurs, an originating context may pass control to another context to perform a particular task. When the originating context receives control again, it may need to establish its credentials and re-set the context ID.

Figure 6:
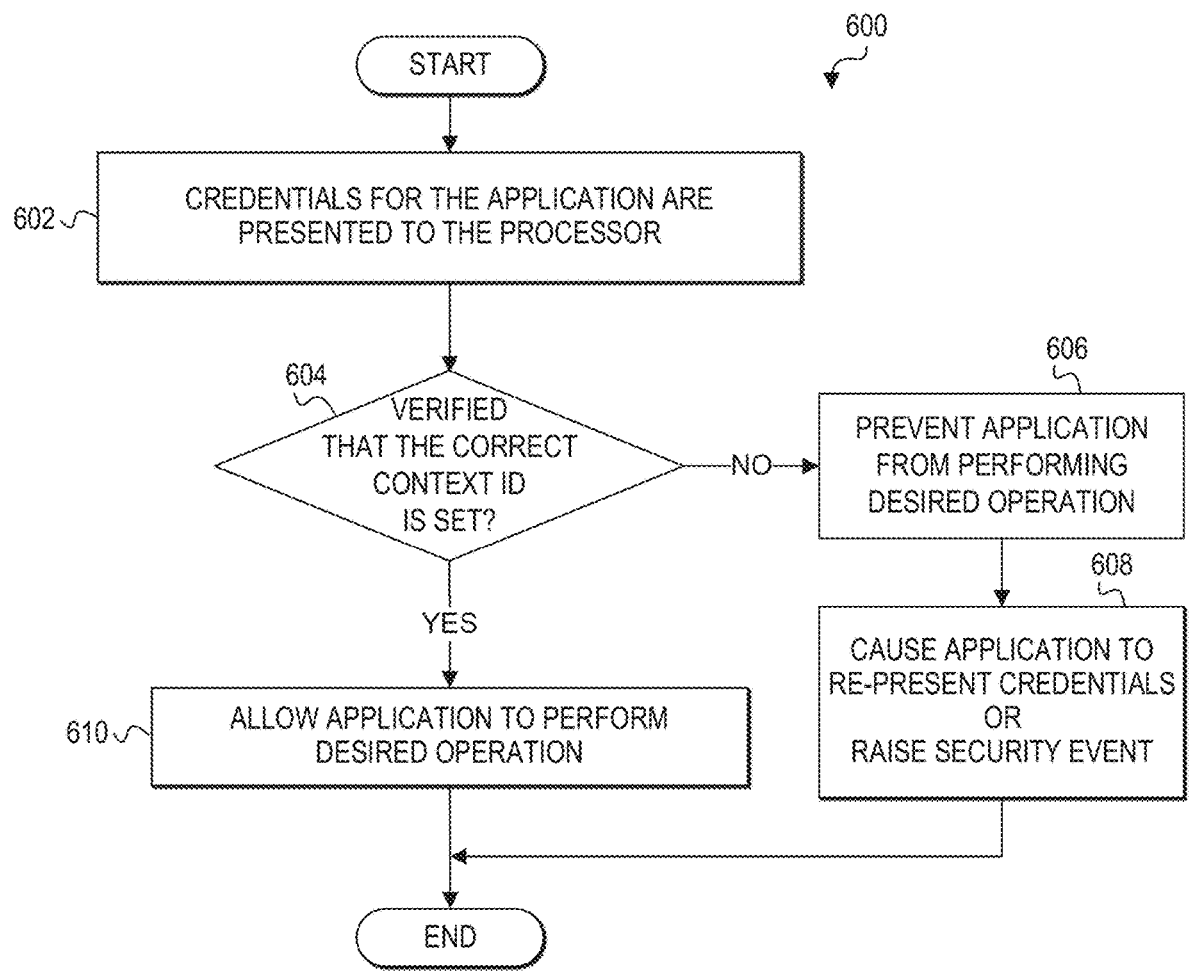
FIG. 6 is a simplified flow diagram illustrating possible operations for verifying credentials of an application that runs on a context-aware central processing unit (CPU) according to an embodiment.

FIG. 6 is a simplified flow diagram illustrating an example process 600 for verifying that a context-aware processor has the correct context ID set for a currently executing application. Process 600 may be executed as part of a new instruction to verify the context ID by the context-aware processor. At 602, the application presents its credentials to the context-aware processor to verify that the processor has the correct context ID set. The credentials can be included as an immediate field in an instruction of a new instruction set architecture (ISA) in an execute-only mode.

At 604, the processor attempts to verify that the correct context ID set in the processor hardware for the presented credentials. Specifically, in at least one embodiment, the processor determines whether the correct context ID is set by identifying the context ID associated with the presented credentials in the supplemental processor memory 180 (e.g., in context ID to credentials mapping 202) and comparing the identified context ID to the context ID set in the control register or MSR (e.g., 118). If the context IDs match, then it is verified that the correct context ID is set in the processor hardware, and at 610, the application is allowed to perform the desired operation requested by the instruction.

If the context IDs do not match, then the correct context ID is not set in the processor hardware, and at 606, the application is prevented from performing the operation requested by the instruction. In at least one embodiment, at 608, the response by the processor may cause the application to execute some corrective code to re-present its credentials. Alternatively, a security event may be raised and the application may be terminated.

Figure 7:
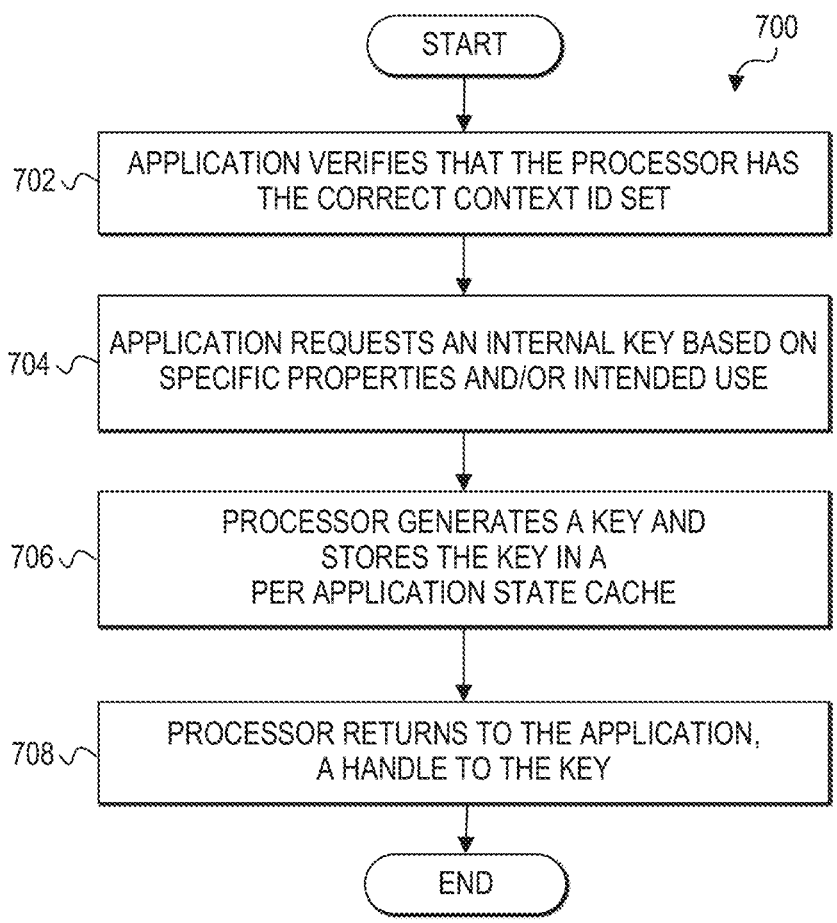
FIG. 7 is a simplified flow diagram illustrating further possible operations that may occur when an application runs on a context-aware central processing unit (CPU) according to an embodiment.

FIG. 7 is a simplified flow diagram illustrating an example process 700 for an application to obtain an internal key (e.g., generated by processor, obtained from keys already stored in processor, etc.) to be used for encrypting data or code. Process 700 includes one or more possible instructions of an application (e.g., application 134A or 134B) being executed by a context-aware processor (e.g., processor 102). Process 700 may be executed after the credentials of an application have been established (e.g., by process 500) on a context-aware processor.

Initially, at 702, the application may present its credentials to the context-aware processor to verify that the correct context ID is set in the processor. The credentials can be included as an immediate field in a context ID verification instruction of a new instruction set architecture (ISA) in an execute-only mode. Process 600 of FIG. 6 is an example process that may be performed may be performed when the context ID verification instruction is executed.

If it is verified in 702 that the correct context ID is set, then at 704, a new instruction to request an internal key (e.g., residing-in-the-CPU key) based on specific properties and/or intended use may be executed. Specific properties and intended use may indicate the particular size of the key that is being requested (e.g., 256 bits for Advanced Encryption Standard (AES) algorithm, 96 bits for Simon algorithm, etc.).

At 706, in response to the application's request, the processor generates a key for the application and stores the key (e.g., 205C) and/or a handle (e.g., 204A, 204B, 204C) for the key in a per application state cache (e.g., supplemental processor memory 180) that is not directly accessible by the application. For example, the key and/or handle can be associated with the credentials of the application, the context ID of the application, or any other suitable identifier of the application, using any appropriate mapping or linking technique. At 708, the processor may return the handle for the key to the application.

Figure 8:
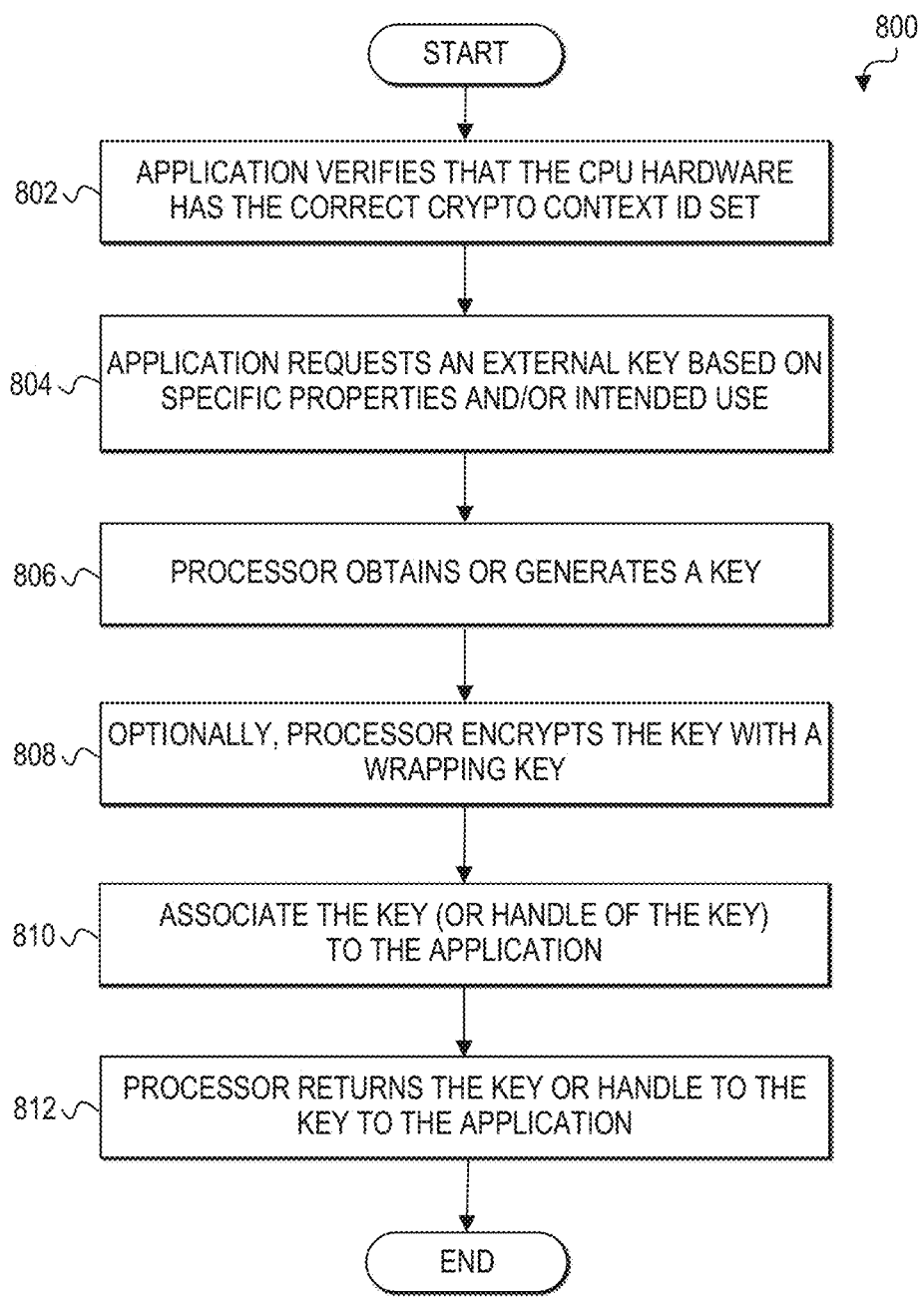
FIG. 8 is a simplified flow diagram illustrating further possible operations that may occur in another embodiment when an application runs on a context-aware CPU according to an embodiment.

FIG. 8 is a simplified flow diagram illustrating an example process 800 for an application to obtain an external key (e.g., generated by a secure external processor handling key management) to be used for encrypting data or code. The process 800 includes one or more possible instructions of an application (e.g., application 134A or 134B) being executed by a context-aware processor (e.g., processor 102). Process 800 may be executed after the credentials of an application have been established (e.g., by process 500) on a context-aware processor.

Initially, at 802, the application may present its credentials to the context-aware processor to verify that the correct context ID is set in the processor. The credentials can be included as an immediate field in a context ID verification instruction of a new instruction set architecture (ISA) in an execute-only mode. Process 600 of FIG. 6 is an example process that may be performed may be performed when the context ID verification instruction is executed.

If it is verified in 802 that the correct context ID is set, then at 804, a new instruction to request an external key (e.g., residing-outside-the-CPU key) based on specific properties and/or intended use may be executed. Specific properties and intended use may indicate the particular size of the key that is being requested (e.g., 256 bits for Advanced Encryption Standard (AES) algorithm, 96 bits for Simon algorithm, etc.).

At 806, the processor initiates the generation of an external key for the application or obtains an external key for the application from an external component. In one or more embodiments, the external component may perform key management and supply the context-aware processor with keys. In other embodiments, the external component may simply provide randomly generated unique values requested by the processor. Examples of an external secure component include, but are not necessarily limited to, a separate secure processor in the same platform or a different platform, a component of a third party component, a component in a local or remote network, or a component in a cloud.

Optionally, at 808, the processor may wrap (i.e., encrypt) the supplied key with a wrapping key to create a handle comprising an encrypted key. In other embodiments, the external supplier of the key may provide a wrapped key such that the processor does not need to encrypt the key before storing it or returning it to the application.

At 810, the processor associates the key and/or a handle of the key to the application. The processor can store the key (e.g., 205C) and/or a handle (e.g., 204A, 204B, or 204C) for the key in a per application state cache (e.g., supplemental processor memory 180) that is not directly accessible by the application. For example, the key and/or handle can be associated with the credentials of the application, the context ID of the application, or any other suitable identifier of the application, using any appropriate mapping or linking technique. At 812, the processor may return the handle of the key to the application.

In addition to creating or obtaining access to keys and encryption secrets generally for applications running on context-agnostic or context-aware processors, one or more embodiments herein can support various levels of cryptographic isolation. FIGS. 9A through 11 illustrate some of the various levels of cryptographic isolation that can be supported based on the concepts disclosed herein. Typically, current architectures are configured with instructions that can be used to move data in and out of memory. For example, in Intel® 64 Architecture and Intel® IA-32 Architecture, various move instructions can be used to copy a source operand to a destination operand, including MOV (move), MOVD (move doubleword), MOVDQU (move unaligned double quadword), MOVDQA (move aligned double quadword), etc. These instructions, however, assume that the data to be moved is unencrypted and that the data to be stored is also unencrypted.

One or more embodiments herein provide a new instruction set architecture (ISA) with cryptographic load and store instructions. In cryptographic store instructions, data is encrypted in the core before leaving the core boundary and before entering the L1 cache. In cryptographic load instructions, encrypted data is decrypted at the core as soon as it crosses the core boundary, after exiting L1 and before being available to software. In computing device 100, for example, for a particular piece of input data or code, encryption store logic 150 executes a cryptographic algorithm (e.g., a block cipher) in the core to compute encrypted data or code based on the appropriate key (and possibly a tweak) for the input data or code. Conversely, for the encrypted data or code, decryption load logic 160 executes a cryptographic algorithm (e.g., the block cipher) in the core to compute decrypted data or code based on the appropriate key (and possibly a tweak) for the encrypted data or code.

In one possible implementation, cryptographic move instructions could be configured to correspond to currently existing move instructions. For example, the new cryptographic instructions could be named IGXMOV, IGXMOVD, IGXMOVDQU, IGXMOVD, IGXMOVD, IGXMOVDQA, etc. The cryptographic instructions could accept additional operands that denote the encryption keys or the wrapped keys (e.g., key handles containing one of encrypted key, pointer to encrypted key stored in memory, or pointer to unencrypted key stored in processor that is not directly accessible by software) to be used for the encryption or decryption of data. In one example, the new cryptographic move instructions could perform both encryption and decryption depending on the particular input data or code. In other implementations, different cryptographic instructions could be used to perform encryption and decryption. Although these are possible implementations, it should be apparent that numerous other suitable operations (e.g., load, read, write, store, etc.), naming conventions, and syntax may be used to implement new cryptographic instructions to enable cryptographic isolation of various levels of memory compartments according to the embodiments disclosed herein.

Figure 9A:
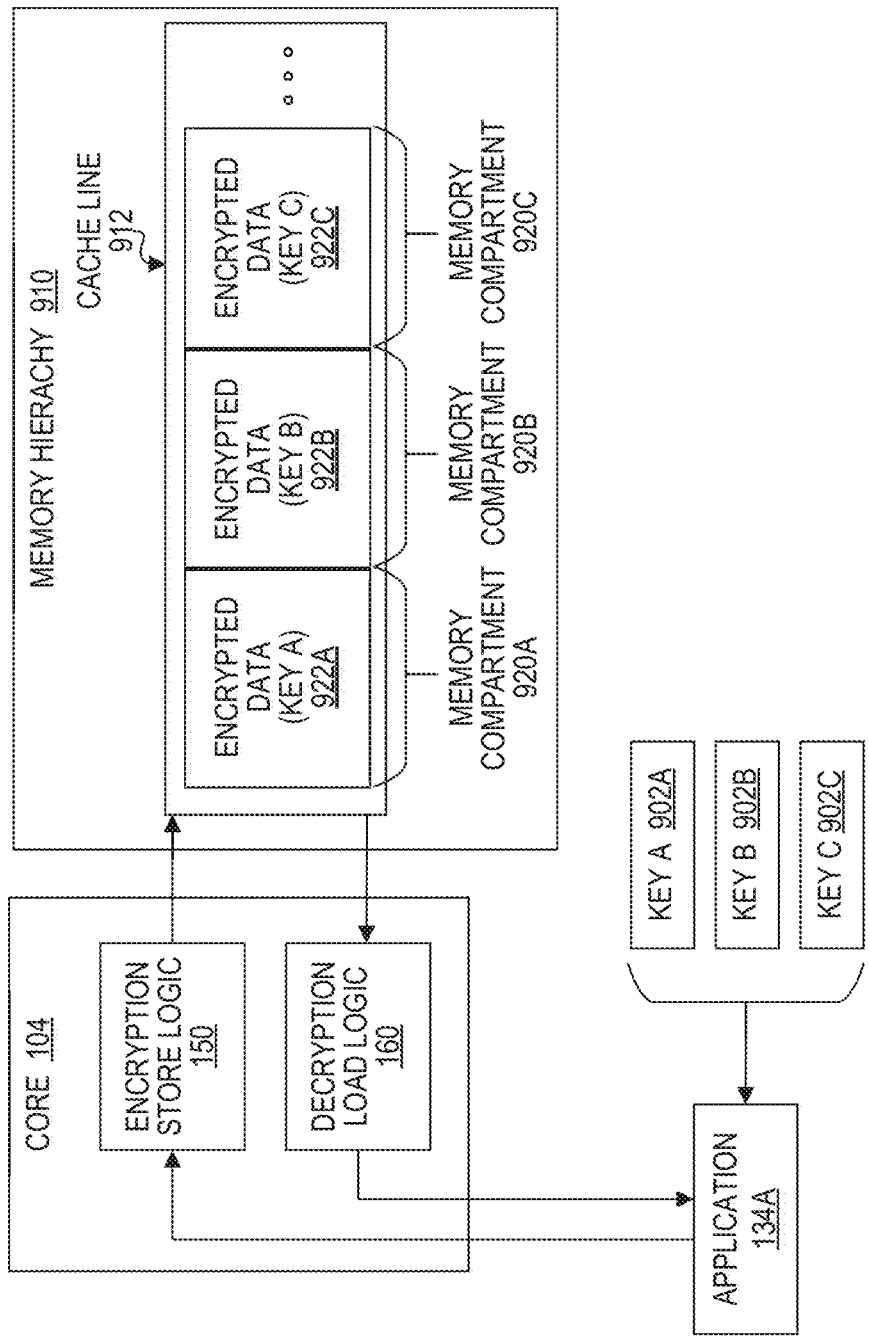
FIG. 9A is a simplified block diagram illustrating an example of cryptographic isolation at a data structure level according to an embodiment.
Figure 9B:
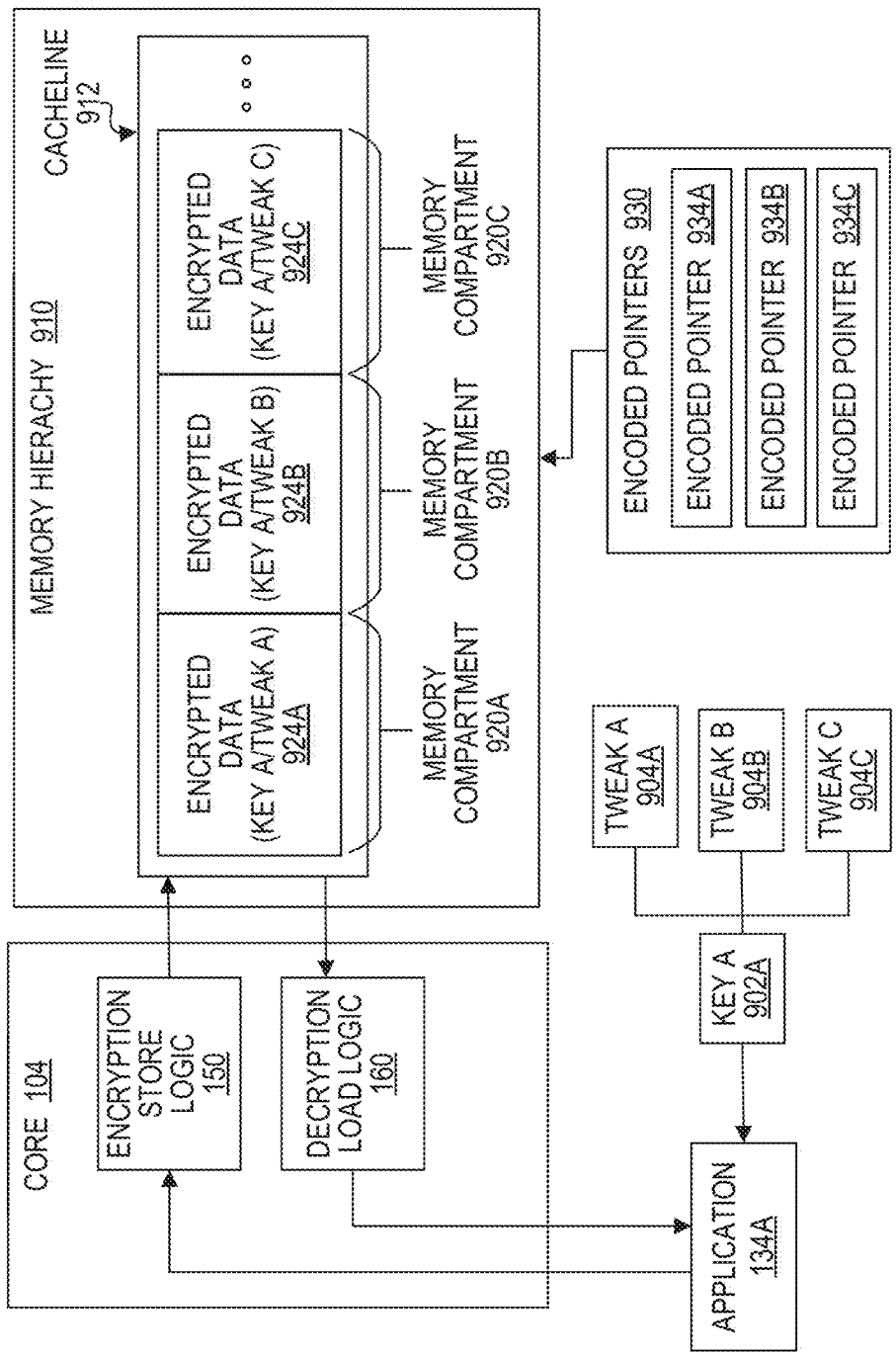
FIG. 9B is a simplified block diagram illustrating another example of cryptographic isolation at a data structure level according to an embodiment.

FIGS. 9A-9B are simplified block diagrams illustrating an example of cryptographic isolation implemented at a data structure level according to the at least one embodiment. FIG. 9A illustrates cryptographic isolation of data structures based on separate keys. The cryptographic isolation of data structures is illustrated with reference to application 134A, core 104, encryption store logic 150, and decryption load logic 160 of computing device 100. In addition, a memory hierarchy 910 is shown and is intended to represent the various forms of memory that may be present in computing device 100, and in which data and/or code of a context (e.g., application 134A), may be stored at some point in time. For example, memory hierarchy 910 could represent cache 170 and memory 120 of computing device 100. Any other memory unit (e.g., L2 cache) in which data and/or code of a context may be store may also be represented by memory hierarchy 910.

In the example of FIG. 9A, three different keys, key A 902A, key B 902 B, and key C 902C have been created for application 134A. If the computing device 100 has a context-agnostic processor, keys A, B, and C may be encrypted with a wrapping key and handles to the keys may be stored in memory (e.g., 120) or in a register file (e.g., 110). In another implementation, respective pointers to the encrypted keys may be encrypted (e.g., at least a slice of the memory address encoded in the pointer can be encrypted) and the encrypted pointers may be stored in memory or a register file. If the computing device 100 has a context-aware processor, then keys A, B, and C and/or handles of keys A, B, and C may be stored in a memory of the processor such as supplemental processor memory 180 as previously described herein. For example, handles may be stored in supplemental processor memory 180 for encrypted keys A, B, and C (e.g., 206A), for pointers (e.g., 207B) to encrypted keys A, B, and C (e.g., 206B) that are stored in memory 120, or for pointers (e.g., 207C) to unencrypted keys A, B, and C (e.g., 205C) that are stored in supplemental processor memory 180. In another embodiment, the keys A, B, and C may be stored in an external component. In one embodiment, handles for keys A, B, and C may be returned to application 134A when created or requested.

A new cryptographic instruction, which is referred to herein as a core-encrypted memory store (e.g., move, write, store, etc.) instruction, can be used by application 134A to encrypt small data structures with unique keys and to move or copy the encrypted data structures into a single cache line 912, effectively creating an isolated memory compartment for each encrypted data structure. The data structures can be 1 byte, 4 bytes, 8 bytes, 16 bytes or any other size that allows multiple data structures to be stored in the same cache line. The data structures are encrypted at a sub-cache line granularity and may stay as such inside all units of the memory hierarchy 910 (e.g., L1, L2, main memory, etc.).

By way of example, the new core-encrypted memory store instruction can cause encryption store logic 150 to execute a cryptographic algorithm (e.g., block cipher) in core 104 on a first data structure of application 134A based on key A 902A to compute encrypted data 922A to be stored in a memory compartment 920A in cache line 912. Encryption store logic 150 can execute the cryptographic algorithm in core 104 on a second data structure of application 134A based on key B 902B to compute encrypted data 922B to be stored in memory compartment 920B in cache line 912. Encryption store logic 150 executes the cryptographic algorithm in core 104 on third data of application 134A based on key C 902C to compute encrypted data 922C to be stored as memory compartment 920C in cache line 912.

In addition, a new cryptographic instruction, which is a core-decrypted memory load instruction (e.g., move, load, read, etc.), can be used by application 134A to decrypt small encrypted data structures with a unique keys and to move or copy the decrypted data structures into a register or other memory to be accessed by application 134A. For example, the new core-decrypted memory load instruction can cause decryption load logic 160 to execute a cryptographic algorithm (e.g., block cipher) in core 104 on first encrypted data 922A from memory compartment 920A based on key A 902A to compute decrypted data to be stored in a register or other memory that can be accessed by application 134A. Similarly, decryption load logic 160 can execute the same cryptographic algorithm in core 104 to decrypt other encrypted data (e.g., 922B, 922C) from other memory compartments (e.g., 920B, 920C).

Like FIG. 9A, FIG. 9B illustrates cryptographic isolation of data structures. The cryptographic isolation in FIG. 9B, however, is based on the same key with different tweaks to isolate the data structures from each other. In the example of FIG. 9B, the single key A 902A has been created for application 134A. In addition, multiple tweaks are associated with key A, including tweak A 904A, tweak B 904B, and tweak C 904C. Key A may be embodied as previously described herein based on whether application 134A is running on a context-agnostic or context-aware processor. Tweaks A, B, and C, however, may be at least partially derived from encoded pointers 930 to the data structures, where the encoded pointers may be cryptographically encoded (e.g., encoded with an encrypted portion of a linear address and/or encrypted metadata) or non-cryptographically encoded (e.g., neither linear address nor metadata encoded in the pointer is encrypted). For example, tweak A 904A may be derived from a first encoded pointer 934A to a first data structure of application 134A, tweak B may be derived from a second encoded pointer 934B to a second data structure of application 134A, and tweak C may be derived from a third encoded pointer 934C to a third data structure of application 134A. In some embodiments the tweak can include an encrypted address slice from the encoded pointer, linear address bits obtained by decoding the encoded pointer, or a part of (or all of) the encoded pointer, which may include encoded metadata (e.g., type/version metadata, size/power metadata, etc.). In addition, some tweaks may also include additional external context information. In at least one embodiment, a tweak can be generated when an encoded pointer is used to access the data or code to which the encoded pointer points.

In this example, the new core-encrypted memory store instruction can cause encryption store logic 150 to execute a cryptographic algorithm (e.g., block cipher) in core 104 on the first data structure of application 134A based on key A 902A and tweak A 904A to compute encrypted data 924A to be stored in memory compartment 920A in cache line 912. Encryption store logic 150 can execute the cryptographic algorithm in core 104 on a second data structure of application 134A based on key B 902B and tweak B 904B to compute encrypted data 924B to be stored in memory compartment 920B in cache line 912. Encryption store logic 150 can execute the cryptographic algorithm in core 104 on third data of application 134A based on key C 902C and tweak C 904C to compute encrypted data 924C to be stored in memory compartment 920C in cache line 912.

Also in this example, the new core-decrypted memory load instruction can cause decryption load logic 160 to execute a cryptographic algorithm (e.g., block cipher) in core 104 on first encrypted data 922A from memory compartment 920A based on key A 902A and tweak A 904A to compute decrypted data to be moved or copied into a register or other memory to be accessed by the application. Similarly, the new core-decrypted memory load instruction can cause decryption load logic 160 to execute the same cryptographic algorithm in core 104 to decrypt other encrypted data (e.g., 922B, 922C) from other memory compartments (e.g., 920B, 920C).

It should be noted that tweaks may also be used in cryptographic isolation of data structures where a different key is used for each data structure, as shown in FIG. 9A. However, in the embodiment of FIG. 9A, cryptographic isolation of the memory compartments of encrypted data can be achieved without tweaks, due to the separate keys used in the encryption for each data structure.

In addition, although application 134A is the only context illustrated in FIGS. 9A-9B, this has been done for ease of description, and it should be apparent that any other context (e.g., virtual machines, functions, threads) may also apply cryptographic isolation at the data structure level. For example, a function may establish credentials and request keys for data structures that it accesses as illustrated in FIGS. 9A-9B with application 134A.

Figure 10A:
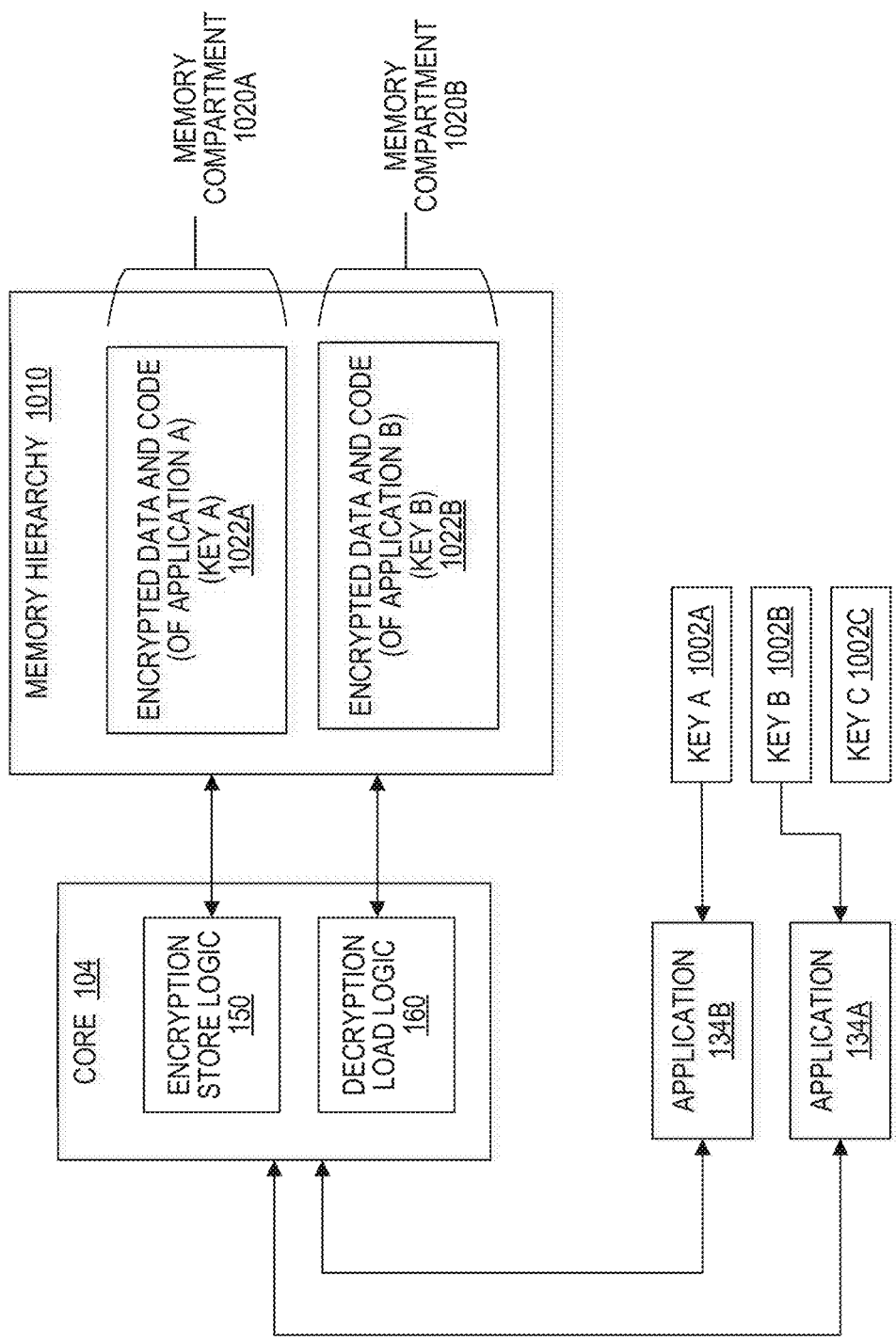
FIG. 10A is a simplified block diagram illustrating an example of cryptographic isolation at an application level according to an embodiment.
Figure 10B:
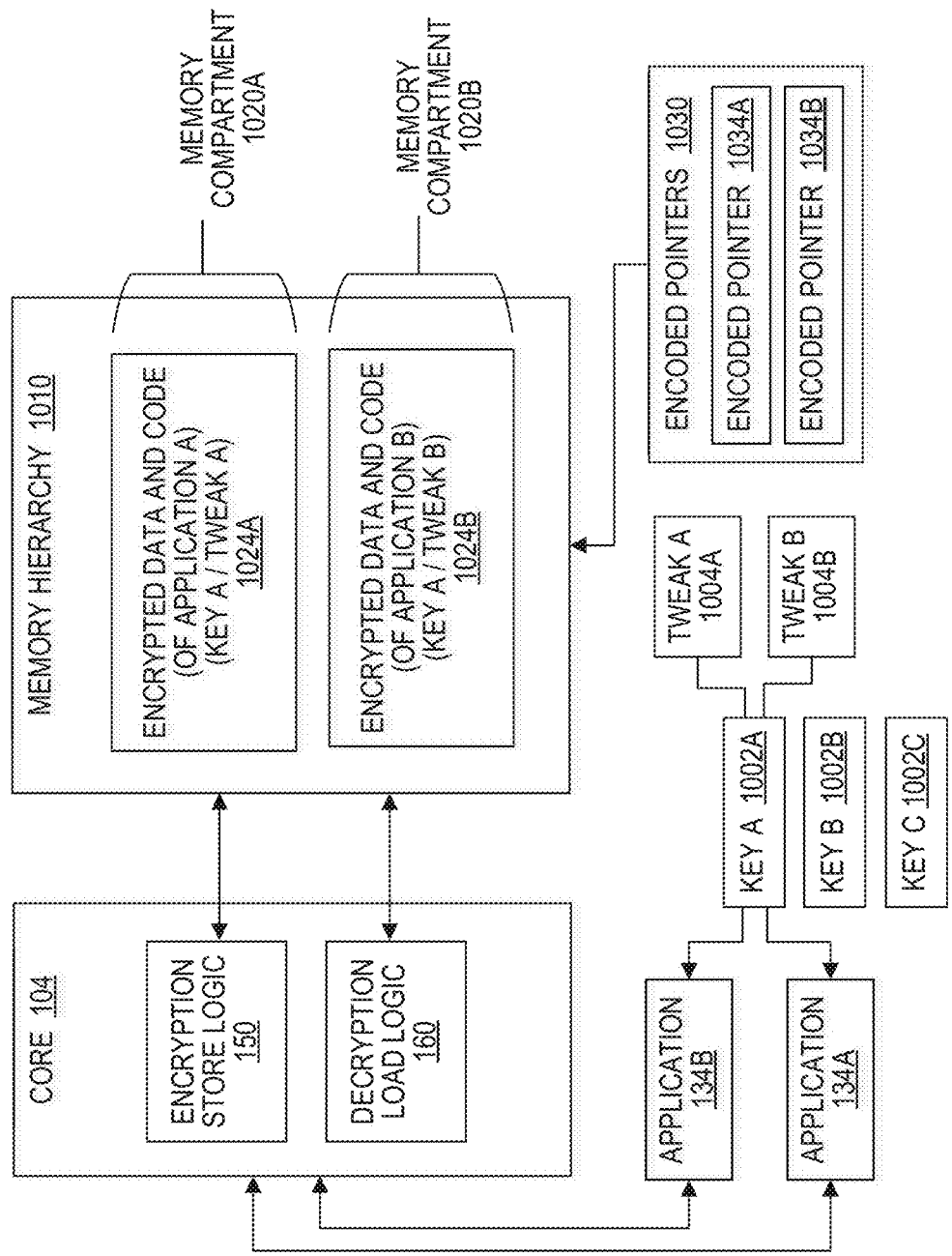
FIG. 10B is a simplified block diagram illustrating another example of cryptographic isolation at an application level according to an embodiment.

FIGS. 10A-10B are simplified block diagrams illustrating an example of cryptographic isolation implemented at an application level according to the at least one embodiment. FIG. 10A illustrates cryptographic isolation of applications based on separate keys. The cryptographic isolation of applications is illustrated with reference to application 134A, application 134B, core 104, encryption store logic 150, and decryption load logic 160 of computing device 100. In addition, a memory hierarchy 1010 is shown and is intended to represent the various forms of memory that may be present in computing device 100, and in which data and/or code of a context (e.g., applications 134A and 134B), may be stored at some point in time. For example, memory hierarchy 1010 could represent cache 170 and memory 120 of computing device 100. Any other memory unit (e.g., L2 cache) in which data and/or code of a context may be store may also be represented by memory hierarchy 1010.

In the example of FIG. 10A, three different keys, key A 1002A, key B 1002 B, and key C 1002C have been created, but each application has access to just one key. In this example, application 134A has access to key A 1002A, and application 134B has access to key B 1002B. If the computing device 100 has a context-agnostic processor, keys A and B may be encrypted with a wrapping key and a separate handle to each key may be stored in memory (e.g., 120) or in a register file (e.g., 110). In another implementation, respective pointers to the encrypted keys may be encrypted (e.g., at least a slice of the memory address encoded in the pointer can be encrypted) and the encrypted pointers may be stored in memory or a register file. If the computing device 100 has a context-aware processor, then keys A and B and/or handles of keys A and B may be stored in a memory of the processor such as supplemental processor memory 180 as previously described herein. For example, handles may be stored in supplemental processor memory 180 for encrypted keys A and B (e.g., 206A), for pointers (e.g., 207B) to encrypted keys A and B (e.g., 206B) that are stored in memory 120, or for pointers (e.g., 207C) to unencrypted keys A and B (e.g., 205C) that are stored in supplemental processor memory 180. In another embodiment, the keys A and B may be stored in an external component. In one embodiment, handles for keys A and B may be returned to application 134A when created or requested.

The new core-encrypted memory store (e.g., move, write, store, etc.) instruction, can be used by the applications 134A and 134B to encrypt their respective data and code with their respective keys A and B. In particular, application 134A can execute the new core-encrypted instruction to encrypt the code and data of application 134A using key A 1002A and to move or copy the encrypted code and data into the memory hierarchy 1010 (e.g., into L1 cache, main memory, etc.), effectively creating an isolated memory compartment for the encrypted data and code of application 134A. Similarly, application 134B can execute the new core-encrypted instruction to encrypt the code and data of application 134B using key B 1002B and to move or copy the encrypted code and data into the memory hierarchy 1010 (e.g., into L1 cache, main memory, etc.), effectively creating an isolated memory compartment for the encrypted data and code of application 134B. In this way, applications have their state isolated through encryption, where encryption happens at the core and uses different wrapped (i.e., encrypted) keys. Each application's state resides in a different memory compartment. An isolated memory compartment at the application level may also be referred to as an enclave, which is an isolated memory region of code and data. In enclaves, addressable memory pages are reserved from the system's physical random access memory (RAM) and then encrypted, allowing the application to access its data and code without exposing its secrets By way of example, the new core-encrypted memory store instruction can cause encryption store logic 150 to execute a cryptographic algorithm (e.g., block cipher) in core 104 on the data and code of application 134A based on key A 1002A to compute encrypted data and code 1022A of application 134A to be stored in a memory compartment 1020A in memory. Encryption store logic 150 can execute the cryptographic algorithm in core 104 on the data and code of a second application 134B based on key B 1002B to compute encrypted data and code 1022B of application 134B to be stored in memory compartment 1020B in memory.

In addition, the new cryptographic instruction, which is a core-decrypted memory load instruction (e.g., move, load, read, etc.), can be used by applications 134A and 134B to decrypt data of application 134A or 134B with a respective key and to move or copy the decrypted data into a register or other memory to be accessed its respective application 134A or 134B. For example, the new core-decrypted memory load instruction can cause decryption load logic 160 to execute a cryptographic algorithm (e.g., block cipher) in core 104 on encrypted data of memory compartment 1020A based on key A 1002A to compute decrypted data to be stored in a register or other memory that can be accessed by application 134A. Similarly, decryption load logic 160 can execute the same cryptographic algorithm in core 104 on encrypted data of memory compartment 1020B based on key B 1002B to compute decrypted data to be stored in a register or other memory that can be accessed by application 134B. Decryption of encrypted code in memory compartments 1020A and 1020B may be performed by the processor when the code is fetched for execution.

Like FIG. 10A, FIG. 10B illustrates cryptographic isolation of applications. The cryptographic isolation in FIG. 10B, however, is based on the same key with different tweaks to isolate the data and code of one application from the data and code of another application. In the example of FIG. 10B, the single key A 1002A has been created for application 134A and application 134B. In addition, multiple tweaks are associated with key A, including tweak A 1004A and tweak B 1004B. Key A may be embodied as previously described herein based on whether application 134A is running on a context-agnostic or context-aware processor. Tweaks A and B, however, may be at least partially derived from encoded pointers 1030 to the application code and data, where the encoded pointers may be cryptographically encoded (e.g., encoded with an encrypted portion of a linear address and/or encrypted metadata) or non-cryptographically encoded (e.g., neither linear address nor metadata encoded in the pointer is encrypted). For example, tweak A 1004A may be derived from a first encoded pointer 1034A to the memory region containing data and code of application 134A, and tweak B may be derived from a second encoded pointer 1034B to the memory region containing data and code of the application 134B. In some embodiments the tweak can include an encrypted address slice from the encoded pointer, linear address bits obtained by decoding the encoded pointer, or a part of (or all of) the encoded pointer, which may include encoded metadata (e.g., type/version metadata, size/power metadata, etc.). In addition, some tweaks may also include additional external context information. In at least one embodiment, a tweak can be generated when an encoded pointer is used to access the data or code to which the encoded pointer points.

In this example, the new core-encrypted memory store instruction can cause encryption store logic 150 to execute a cryptographic algorithm (e.g., block cipher) in core 104 on the data and code of application 134A based on key A 1002A and tweak A 1004A to compute encrypted data and code 1024A of application 134A to be stored in memory compartment 1020A. Encryption store logic 150 can execute the cryptographic algorithm in core 104 on data and code of application 134B based on key A 1002A and tweak B 1004B to compute encrypted data and code 1024B of application 134B to be stored in memory compartment 1020B.

Also in this example, the new core-decrypted memory load instruction can cause encryption store logic 150 to execute a cryptographic algorithm (e.g., block cipher) in core 104 on the encrypted data of an application in an isolated memory compartment, based on an appropriate key and tweak to compute decrypted data of the application and to move or copy the decrypted data into a register or other memory to be accessed by the application. For example, the new core-decrypted memory load instruction can cause decryption load logic 160 to execute a cryptographic algorithm (e.g., block cipher) in core 104 on encrypted data in memory compartment 1020A based on key A 1002A and tweak 1004A to compute decrypted data to be stored in a register or other memory that can be accessed by application 134A. Similarly, the new core-decrypted memory load instruction can cause decryption load logic 160 to execute a cryptographic algorithm (e.g., block cipher) in core 104 on encrypted data in memory compartment 1020B based on key A 1002A and tweak 1004B to compute decrypted data to be stored in a register or other memory that can be accessed by application 134B. Decryption of encrypted code in memory compartments 1020A and 1020B may be performed by the processor when the code is fetched for execution.

It should be noted that tweaks may also be used in cryptographic isolation of applications where a different key is used for each application, as shown in FIG. 10A. However, in the embodiment of FIG. 10A, cryptographic isolation of the memory compartments for encrypted data and code of the applications can be achieved without tweaks, due to the separate keys used in the encryption for each application.

Figure 11:
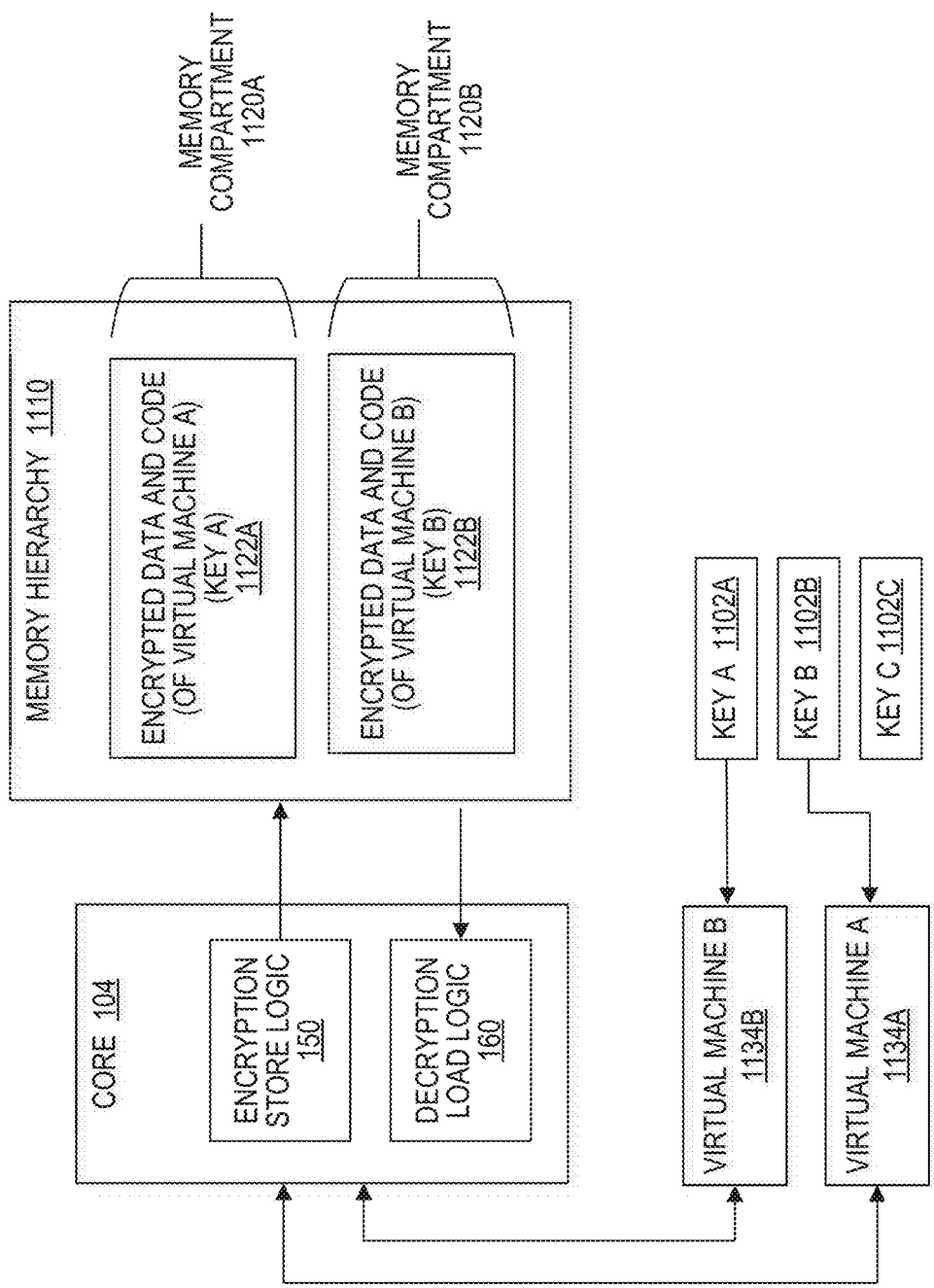
FIG. 11 is a simplified block diagram illustrating an example of cryptographic isolation at a virtual machine level according to an embodiment.

FIG. 11 is a simplified block diagram illustrating an example of cryptographic isolation implemented at a virtual machine level according to the at least one embodiment. FIG. 11 illustrates cryptographic isolation of virtual machines based on separate keys. The cryptographic isolation of virtual machines is illustrated with reference to virtual machine 1134A, virtual machine 1134B, core 104, encryption store logic 150, and decryption load logic 160 of computing device 100. In addition, a memory hierarchy 1110 is shown and is intended to represent the various forms of memory that may be present in computing device 100, and in which data and/or code of a context (e.g., virtual machines 1134A and 1134B), may be stored at some point in time. For example, memory hierarchy 1110 could represent cache 170 and memory 120 of computing device 100. Any other memory unit (e.g., L2 cache) in which data and/or code of a context may be store may also be represented by memory hierarchy 1110.

In the example of FIG. 11, three different keys, key A 1102A, key B 1102 B, and key C 1102C have been created, but each virtual machine has access to just one key. In this example, virtual machine 1134A has access to key A 1102A, and virtual machine 1134B has access to key B 1102B. If the computing device 100 has a context-agnostic processor, keys A and B may be encrypted with a wrapping key and a separate handle to each key may be stored in memory (e.g., 120) or in a register file (e.g., 110). In another implementation, respective pointers to the encrypted keys may be encrypted (e.g., at least a slice of the memory address encoded in the pointer can be encrypted) and the encrypted pointers may be stored in memory or a register file. If the computing device 100 has a context-aware processor, then keys A and B and/or handles of keys A and B may be stored in a memory of the processor such as supplemental processor memory 180 as previously described herein. For example, handles may be stored in supplemental processor memory 180 for encrypted keys A and B (e.g., 206A), for pointers (e.g., 207B) to encrypted keys A and B (e.g., 206B) that are stored in memory 120, or for pointers (e.g., 207C) to unencrypted keys A and B (e.g., 205C) that are stored in supplemental processor memory 180. In another embodiment, the keys A and B may be stored in an external component. In one embodiment, handles for keys A and B may be returned to virtual machine 1134A when created or requested.

The new core-encrypted memory store (e.g., move, write, store, etc.) instruction, can be used by the virtual machines 1134A and 1134B to encrypt their respective data and code with their respective keys A and B. In particular, virtual machine 1134A can execute the new core-encrypted instruction to encrypt the code and data of virtual machine 1134A using key A 1102A and to move or copy the encrypted code and data into the memory hierarchy 1110 (e.g., into L1 cache, main memory, etc.), effectively creating an isolated memory compartment for the encrypted data and code of virtual machine 1134A. Similarly, virtual machine 1134B can execute the new core-encrypted instruction to encrypt the code and data of virtual machine 1134B using key B 1102B and to move or copy the encrypted code and data into the memory hierarchy 1110 (e.g., into L1 cache, main memory, etc.), effectively creating an isolated memory compartment for the encrypted data and code of virtual machine 1134B. In this way, applications have their state isolated through encryption, where encryption happens at the core and uses different wrapped (i.e., encrypted) keys. Each application's state resides in a different memory compartment. An isolated memory compartment at the virtual machine level may also be referred to as a trusted domain, which is an isolated memory region of containing code and data of one or more applications.

By way of example, the new core-encrypted memory store instruction can cause encryption store logic 150 to execute a cryptographic algorithm (e.g., block cipher) in core 104 on the data and code of virtual machine 1134A based on key A 1102A to compute encrypted data and code 1122A of virtual machine 11344A to be stored in a memory compartment 1120A in memory. Encryption store logic 150 can execute the cryptographic algorithm in core 104 on the data and code of a second virtual machine 1134B based on key B 1102B to compute encrypted data and code 1122B of virtual machine 1134B to be stored in memory compartment 1120B in memory.

In addition, the new cryptographic instruction, which is a core-decrypted memory load instruction (e.g., move, load, read, etc.), can be used by virtual machines 1134A and 1134B to decrypt their respective data and code with their respective keys A and B. For example, the new core-decrypted memory load instruction can cause decryption load logic 160 to execute a cryptographic algorithm (e.g., block cipher) in core 104 on encrypted data of memory compartment 1120A based on key A 1102A to compute decrypted data to be stored in a register or other memory that can be accessed by virtual machine 1134A or an application within virtual machine 1134A. Similarly, decryption load logic 160 can execute the same cryptographic algorithm in core 104 on encrypted data of memory compartment 1120B based on key B 1102B to compute decrypted data to be stored in a register or other memory that can be accessed by virtual machine 1134B or an application within virtual machine 1134B. Decryption of encrypted code in memory compartments 1120A and 1120B may be performed by the processor when the code is fetched for execution.

Figure 12:
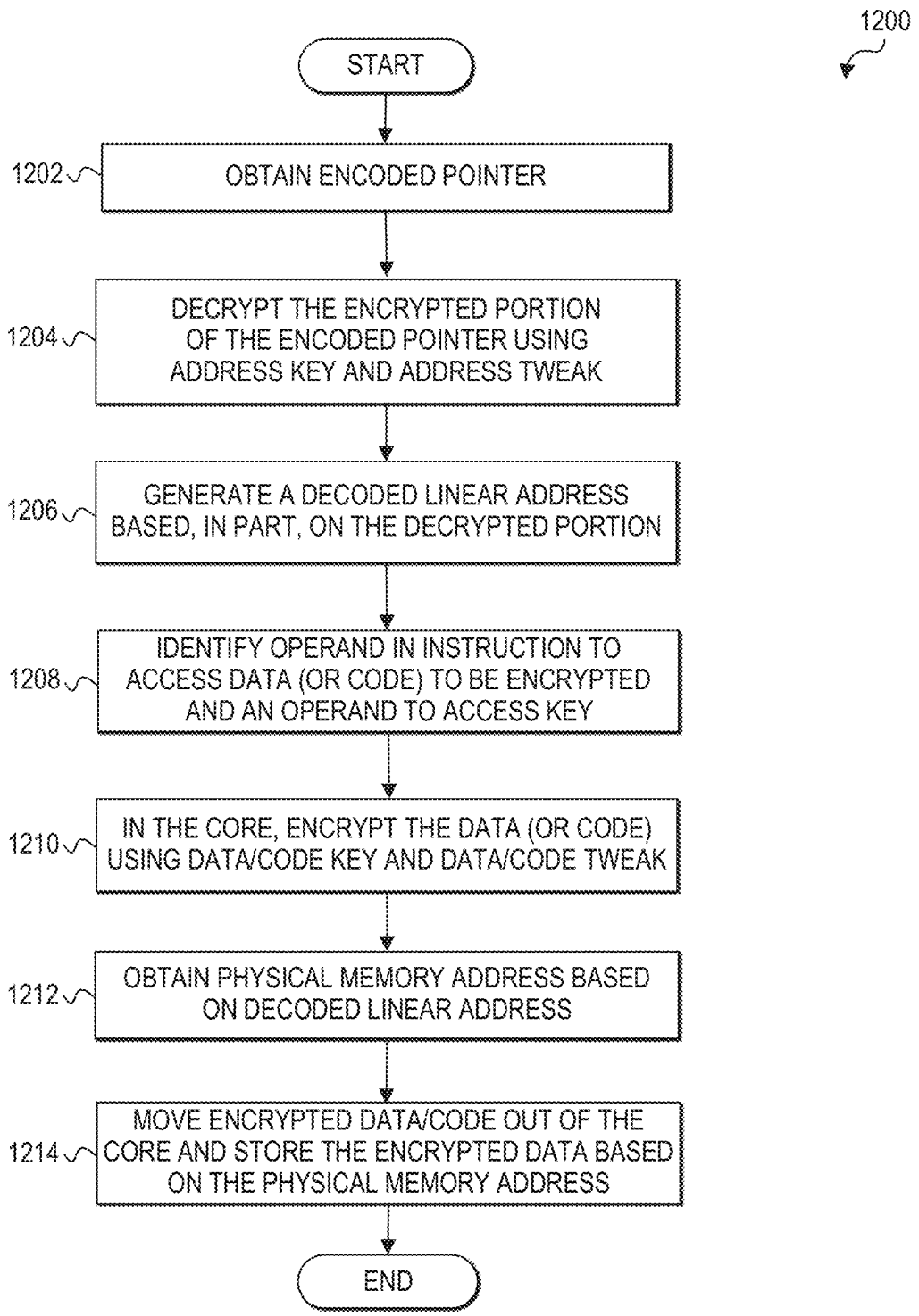
FIG. 12 is a simplified flow diagram illustrating a possible process for a cryptographic store instruction according to an embodiment.

FIG. 12 is a simplified flow diagram illustrating an example process 1200 associated with the execution of a new core-encrypted memory store instruction in accordance with one or more embodiments. At least some portions of process 1200 may be executed by hardware, firmware, and/or software of computing device 100. In the example shown in FIG. 12, at 1202, an encoded pointer to memory or code is obtained. The pointer references or "points to" a memory location where encrypted data or encrypted code is to be stored. The encoded pointer may be provided as a register operand in the core-encrypted memory store instruction in one embodiment. The pointer may be cryptographically encoded (e.g., encoded with an encrypted portion of a linear address and/or encrypted metadata) or non-cryptographically encoded (e.g., neither linear address nor metadata encoded in the pointer is encrypted).

At 1204, if there is an encrypted portion of the encoded pointer, the encrypted portion is decrypted using an address key and possibly an address tweak. At 1206, a decoded linear address is generated based, in part, on the decrypted portion of the pointer. The decoded linear address corresponds to the memory location where encrypted data or encrypted code is to be stored.

At 1208, an operand of the core-encrypted memory store instruction indicates data (or code) to be encrypted and stored. In one example, the data (or code) may be indicated by a register operand. In addition, another operand may contain a handle to denote a key to be used to encrypt the data (or code). The handle may be configured in any number of ways as previously discussed herein and may contain a wrapped key, a pointer to a wrapped key stored in memory, or a pointer to an unencrypted key stored in processor memory. The key may be wrapped separately or may be wrapped together with other information in the handle. In some embodiments, the handle may contain only the wrapped key or only the pointer. In other embodiments, the handle may contain additional information (e.g., MAC, other keys, etc.). Additionally, the handle may be used for both decryption (e.g., for loading, reading) and encryption (e.g., for storing, writing) of the data or code.

The wrapped key may be decrypted to produce a decrypted (or unencrypted) key for encrypting the data (or code) to be stored. The handle may have previously been obtained by the application, for example, using one or more processes of FIGS. 5-8. At 1210, the data is encrypted, in the core, using the decrypted (or unencrypted) key and possibly a data tweak. The tweak may be generated by deriving at least a portion from the encoded pointer, the decoded linear address bits, metadata encoded in the pointer and/or external context information. The tweaks may be implicit or may be managed by software.

At 1212, a physical address in the memory corresponding to the decoded linear address is obtained. At 1214, the encrypted data is moved out of the core and stored based on the physical memory address. In some embodiments, however, once the data is encrypted, it may be moved out of the core and first stored to another memory such as L1 cache, L2 cache, etc., before being stored in main memory.

Figure 13:
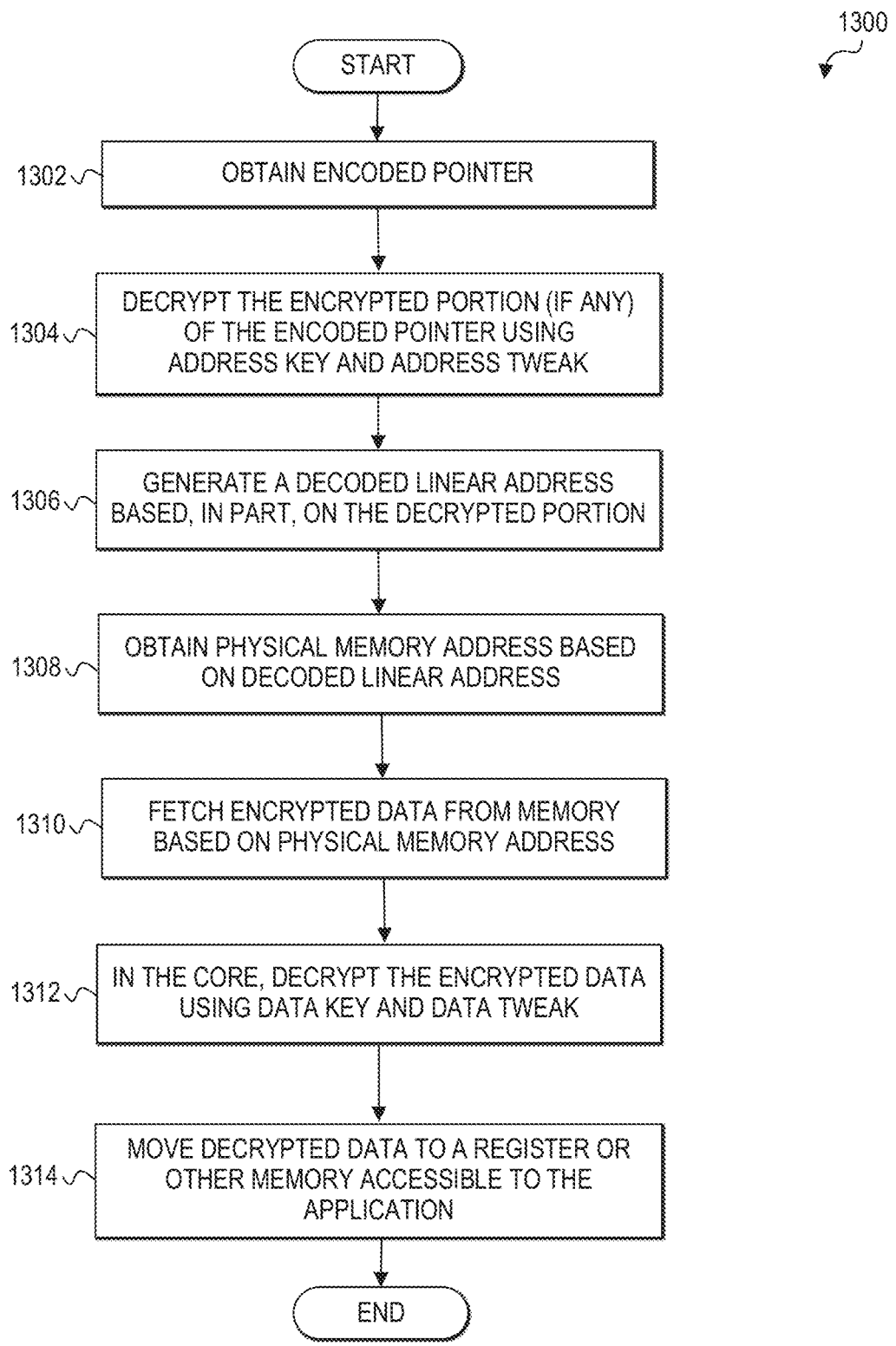
FIG. 13 is a simplified flow diagram illustrating a possible process for a cryptographic load instruction according to an embodiment.

FIG. 13 is a simplified flow diagram illustrating an example process 1300 associated with the execution of a new core-decrypted memory load instruction in accordance with one or more embodiments. At least some portions of process 1300 may be executed by hardware, firmware, and/or software of computing device 100. In the example shown in FIG. 13, at 1302, an encoded pointer to memory or code is obtained. The pointer references or "points to" a memory location from which encrypted data or encrypted code is to be retrieved. The encoded pointer may be provided as a register operand in the core-decrypted memory load instruction in one embodiment. The pointer may be cryptographically encoded (e.g., encoded with an encrypted portion of a linear address and/or encrypted metadata) or non-cryptographically encoded (e.g., neither linear address nor metadata encoded in the pointer is encrypted).

At 1304, if there is an encrypted portion of the encoded pointer, the encrypted portion is decrypted using an address key and possibly an address tweak. At 1306, a decoded linear address is generated based, in part, on the decrypted portion of the pointer. The decoded linear address corresponds to the memory location where encrypted data or code is to be retrieved or fetched. At 1308, a physical address in the memory corresponding to the decoded linear address is obtained. At 1310, the physical address is used to retrieve or fetch data (or code) from memory.

In addition to the operand in the core-decrypted memory load instruction containing the encoded pointer, another operand may contain a handle to denote a key to be used to decrypt the fetched data (or code). The handle may be configured in any number of ways as previously discussed herein and may contain a wrapped key, a pointer to a wrapped key stored in memory, or a pointer to an unencrypted key stored in processor memory. The key may be wrapped separately or may be wrapped together with other information in the handle.

In some embodiments, the handle may contain only the wrapped key or only the pointer. In other embodiments, the handle may contain additional information (e.g., MAC, other keys, etc.). Additionally, the handle may be used for both decryption (e.g., for loading, reading) and encryption (e.g., for storing, writing) of the data or code. The wrapped key may be decrypted to produce a decrypted (or unencrypted) key for decrypting the data (or code) to be loaded. The handle may have previously been obtained by the application, for example, using one or more processes of FIGS. 5-8.

At 1312, the data is decrypted, in the core, using the decrypted (or unencrypted) key and possibly a data tweak. The tweak may be generated by deriving at least a portion from the encoded pointer, the decoded linear address bits, metadata encoded in the pointer and/or external context information. The tweaks may be implicit or may be managed by software. At 1314, the decrypted data is loaded to a register or other memory to be accessible to the application.

Figure 14:
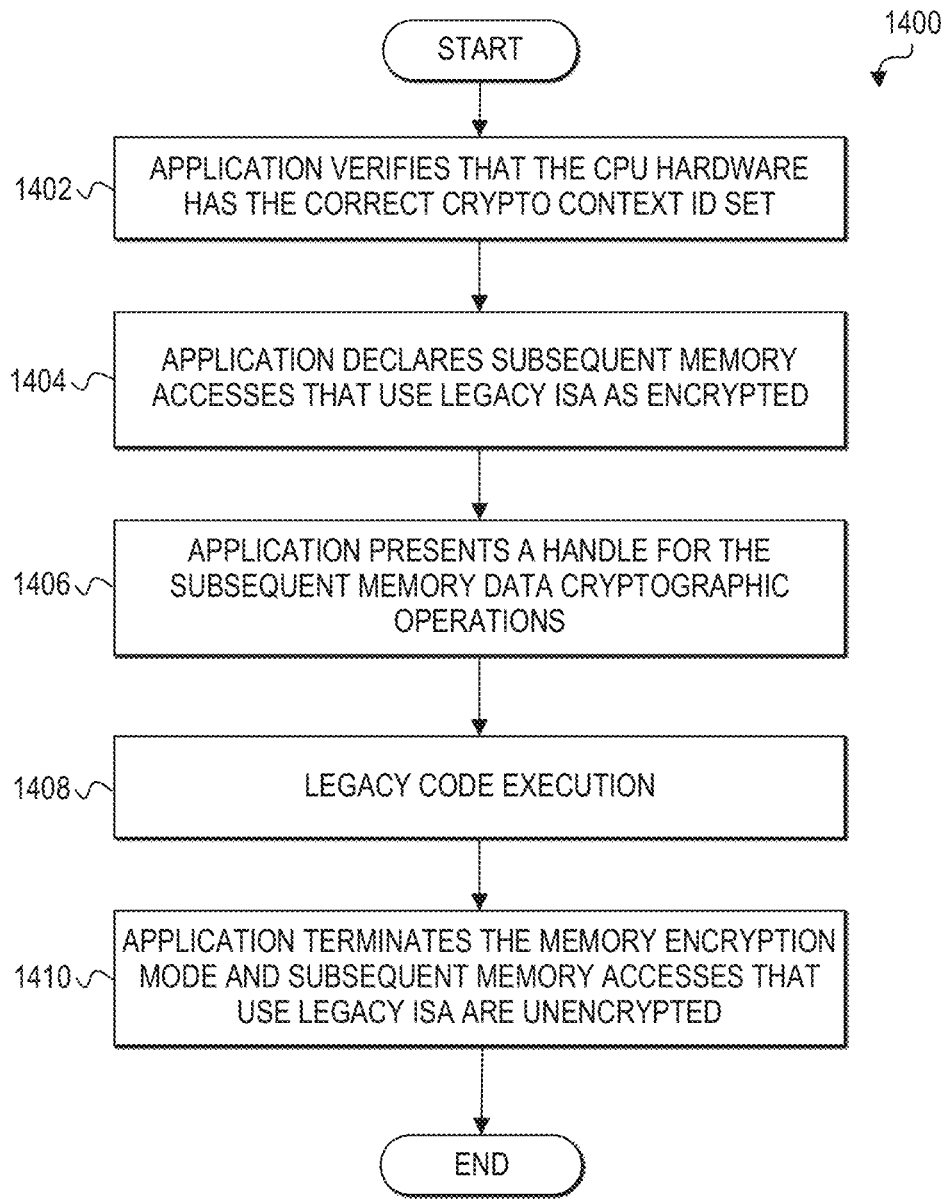
FIG. 14 is a simplified flow diagram illustrating possible operations for supporting legacy applications without recompilation according to an embodiment.

FIG. 14 is a simplified flow diagram illustrating an example process 1400 associated with the execution of legacy code in a system using cryptographic isolation of memory compartments in accordance with one or more embodiments. Process 1400 includes one or more possible instructions of a context (e.g., application 134A or 134B, virtual machine 1134A or 1134B, etc.) being executed by a context-aware processor or a context agnostic processor. Process 1400 may be executed to support execution of legacy binaries without requiring re-compilation of the legacy code. Although process 1400 could be performed by any context, for ease of illustration, process 1400 will be described with reference to a particular context, i.e., an application.

If the application is running on a context-aware processor, then at 1402, the application may present its credentials to the context-aware processor to verify that the correct context ID is set in the processor. The credentials can be included as an immediate operand in an instruction of a new instruction set architecture (ISA) in an execute-only region of memory to prevent an adversary from reading the credentials, or as some other type of operand. This instruction is the one also referred to as "SetContextID" in this specification. In some embodiments, control-flow integrity may be combined with execute-only memory to prevent an adversary from jumping to unintended code entrypoints that may reveal the credential. Process 600 of FIG. 6 is an example process that may be performed when the SetContextID instruction is executed. If the application is running on a context-agnostic processor, then 1402 may be omitted from the process. If the context ID that is in the processor at the time when SetContextID begins executing does not match the SetContextID operand, then a fault may be generated in certain embodiments. Alternatively, the context ID in the processor may be updated with the value in the operand.

If it is verified in 1402 that the correct context ID is set, then at 1404, an instruction of the new ISA may be executed to declare that subsequent memory accesses that use legacy instructions are encrypted. That is, the instruction sets a cryptographic mode of operation in which subsequent memory accesses that use a legacy ISA are to be executed as encrypted memory accesses so that data moving out of the processor core into memory is encrypted and data moving into the processor core is decrypted.

At 1406, another instruction of the new ISA may be executed by the application to present at least one handle to the processor for the cryptographic operations (i.e., encryption and decryption) that may be performed by the legacy code. Multiple handles (or encrypted keys/tweaks) may be presented depending on the type of cryptographic isolation that is implemented. For example, cryptographic isolation at the data structure, function, or thread level may require multiple handles or keys/tweaks for the multiple isolated (encrypted) memory compartments at that level. In some embodiments, a single handle may contain all of the needed keys and/or tweaks. In other embodiments, multiple handles may be presented.

At 1408, subsequent legacy code instructions are executed by the processor in the cryptographic mode of operation set at 1404, such that all memory accesses are encrypted or decrypted with appropriate keys and/or tweaks. That is, when the cryptographic mode of operation is set at 1404, the processor will perform encryption and decryption in the core for all load and store legacy instructions that are invoked. Thus, any legacy code data movement causes the data to be encrypted before the data exits the processor core (for a data store operation) or to be decrypted as the data enters the processor core (for a load operation). In addition, any state that the legacy code loads is assumed to be encrypted. Thus, the state that is available to the legacy code has to be encrypted with the same key that is used to perform the decryption for a legacy load operation. This can be managed by a higher privileged entity that launches the entity with the legacy code.

At 1410, the application may terminate the cryptographic mode of operation 1410. All subsequent memory accesses that use legacy code are performed as unencrypted and are performed in a regular way. However, a new cryptographic mode of operation for another virtual machine or application, for example, may be turned on.

Figure 15:
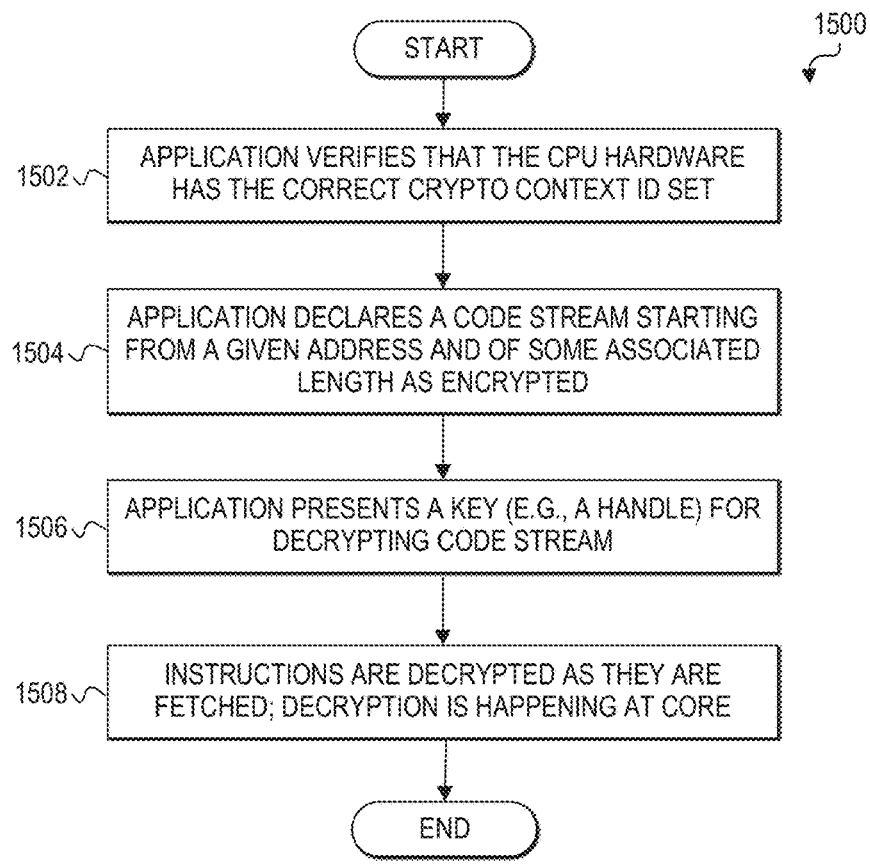
FIG. 15 is a simplified flow diagram illustrating possible operations for encrypting code streams according to an embodiment.

FIG. 15 is a simplified flow diagram illustrating an example process 1500 associated with the execution of encrypted code streams. Process 1500 includes one or more possible instructions of a context (e.g., application 134A or 134B, virtual machine 1134A or 1134B, etc.) being executed by a context-aware processor (e.g., processor 102). Process 1500 may be executed to support execution of encrypted code streams after the credentials of the application have been established and a context ID has been set by the processor. Although process 1500 could be performed by any context, for ease of illustration, process 1500 will be described with reference to a particular context, i.e., an application.

If the application is running on a context-aware processor, then at 1502, the application may present its credentials to the context-aware processor to verify that the correct context ID is set in the processor. The credentials can be included as an immediate operand in an instruction of a new instruction set architecture (ISA) in an execute-only region of memory to prevent an adversary from reading the credentials, or as some other type of operand. This instruction is the one also referred to as "SetContextID" in this specification. In some embodiments, control-flow integrity may be combined with execute-only memory to prevent an adversary from jumping to unintended code entrypoints that may reveal the credential. Process 600 of FIG. 6 is an example process that may be performed when the SetContextID instruction is executed. If the application is running on a context-agnostic processor, then 1502 may be omitted from the process. If the context ID that is in the processor at the time when SetContextID begins executing does not match the SetContextID operand, then a fault may be generated in certain embodiments. Alternatively, the context ID in the processor may be updated with the value in the operand.

If it is verified in 1502 that the correct context ID is set, then at 1504, an instruction of the new ISA may be executed to declare a code stream starting from a given address and of some associated length as encrypted. The instruction to declare a code stream encrypted also can include an encoded pointer (cryptographically or non-cryptographically encoded) to the code stream.

At 1506, another instruction of the new ISA may be executed by the application to present at least one handle to the processor for decrypting the code stream. The handle may include only a wrapped code key. In other scenarios, the handle may also include other wrapped keys (e.g., address key to decrypt a cryptographically encoded pointer to the code stream, a tweak to be used with the key for decrypting the code stream) and/or information (e.g., MAC) as previously described herein. In other embodiments, the instruction to declare the code stream as encrypted may accept an additional operand for the encrypted key or handle to be used to decrypt the code stream.

At 1508, subsequent instructions are decrypted as they are fetched until the last encrypted instruction is fetched and decrypted. The last encrypted instruction can be identified based on the beginning of the code stream that was declared to be encrypted at 1504, and the associated length of the code stream. Thus, the processor keeps track of the amount of code (e.g., number of bytes) that is fetched until it determines that the associated length of the declared code has been fetched.

Once the processor receives the handle from the application, it obtains an unencrypted key from the handle. For example, if the handle contains an encrypted key, the processor decrypts the wrapped (i.e., encrypted) key and uses the key to decrypt the code stream as instructions are fetched. If the handle comprises a pointer to an encrypted key stored in memory, then the processor fetches the encrypted key from memory, decrypts the encrypted key, and uses the now unencrypted key to decrypt the code stream as instructions are fetched. If the handle comprises a pointer to an unencrypted key in processor memory, then the processor fetches the unencrypted key from the processor memory, and uses the unencrypted key to decrypt the code stream as instructions are fetched. The instructions in the code stream are decrypted in the core. In one or more embodiments, the encoded pointer to the code may also be used to derive a tweak to be used in the decryption of the code stream.

Figure 16A:
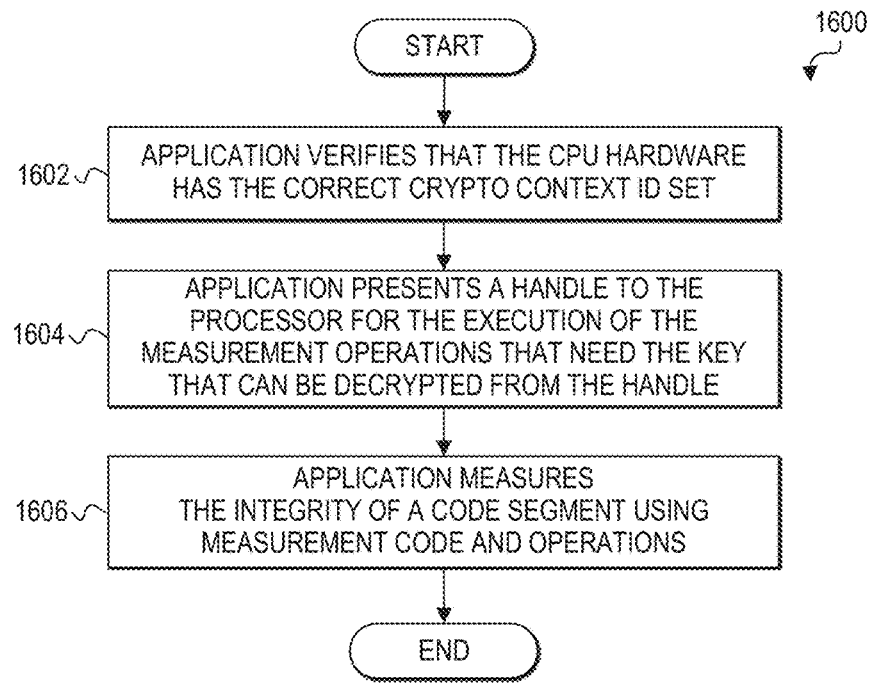
FIG. 16A is a simplified flow diagram illustrating possible operations for measuring the integrity of given code according to an embodiment.

FIG. 16A is a simplified flow diagram illustrating an example process 1600 associated with measuring the integrity of a code segment. Process 1600 includes one or more possible instructions of a context (e.g., application 134A or 134B, virtual machine 1134A or 1134B, etc.) being executed by a context-aware processor (e.g., processor 102) Process 1600 may be executed to measure the integrity of loaded code using the new ISA. Although process 1600 could be performed by any context, for ease of illustration, process 1600 will be described with reference to a particular context, i.e., an application.

If the application is running on a context-aware processor, then at 1602, the application may present its credentials to the context-aware processor to verify that the correct context ID is set in the processor. The credentials can be included as an immediate operand in an instruction of a new ISA in an execute-only region of memory to prevent an adversary from reading the credentials, or as some other type of operand. This instruction is the one also referred to as "SetContextID" in this specification. In some embodiments, control-flow integrity may be combined with execute-only memory to prevent an adversary from jumping to unintended code entrypoints that may reveal the credential. Process 600 of FIG. 6 is an example process that may be performed when the SetContextID instruction is executed. If the application is running on a context-agnostic processor, then 1602 may be omitted from the process. If the context ID that is in the processor at the time when SetContextID begins executing does not match the SetContextID operand, then a fault may be generated in certain embodiments. Alternatively, the context ID in the processor may be updated with the value in the operand.

At 1604, another instruction of the new ISA, which is referred to herein as "MeasureCode" instruction, may be executed by the application to present at least one encrypted key or handle to the processor for execution of integrity measurement operations that need the key along with a specifier for the code segment to be measured, e.g., the starting and ending addresses for the code segment. The handle or encrypted key may have been previously generated by the processor (or an external secure processor) and stored internally in memory that is not accessible to the application. Each of the measurement operations may be one of an "Initialize" operation an "Update" operation or a "Finalize" operation. The logic implementing these operations may be performing measurements according to a known cryptographic integrity algorithm such as KMAC-SHA3, HMAC-SHA512 or HMAC-SHA256. The MeasureCode instruction may accept an immediate operand specifying whether the operation to be performed is an "Initialize", an "Update", or a "Finalize" operation. Conversely, the MeasureCode instruction may be one of a plurality of three different instructions, a "MeasureCode_Initialize" instruction, a "MeasureCode_Update" instruction and a "MeasureCode_Finalize" instruction, each performing a different measurement operation from among "MeasureCode_Initialize", "MeasureCode_Update", and "MeasureCode_Finalize" operations The measurement is bound to a set of keys or tweaks that are associated with the identified code segment to be checked, that are generated by a processor (or secure external processor), and that are hidden from the software.

A MeasureCode instruction may store the measurement in a new CurrentMeasurement control register (referred to herein as "CurrentMeasurement" control register), MSR, or any other register that is accessible using state save and restore instructions such as XSAVE and XRSTOR or other supervisor or usermode instructions. Unauthorized code may be prevented from using instructions to access CurrentMeasurement, e.g., by restricting the instructions to not be usable in usermode, or by scanning unauthorized code for unauthorized instructions prior to executing the code. The measurement may be compared against an expected measurement supplied in another instruction (referred to herein as "ExpectCode" instruction) that follows the MeasureCode instruction. The expected measurement may be specified as an operand to an ExpectCode instruction that is protected from being overwritten by an adversary, e.g., by storing the expected measurement in non-writable memory. If the value in CurrentMeasurement does not match the expected measurement, then a fault may be generated to prevent execution from continuing into the data processing code following the ExpectCode instruction.

In certain embodiments, to prevent an adversary from omitting or jumping past an ExpectCode instruction straight to the data processing code to decrypt data and consequently gain access to plaintext data, the data encryption may be bound to the measurement of the code authorized to access the plaintext data. For example, the expected measurement may be included in the tweak when the data is encrypted, and the value of CurrentMeasurement may be included in the tweak when the data is decrypted. The data may be decrypted incorrectly if it is accessed with a CurrentMeasurement value that does not match the measurement that was used to encrypt the data. A new instruction, referred to herein as "ClearMeasurement" instruction, may be used to clear CurrentMeasurement when data processing has completed and control is being transferred to a code segment that is not authorized to access the plaintext data.

At 1606, the integrity measurement code operations are executed to measure the integrity of the identified code segment. In one example, the integrity measurement code to perform the measurement operations may be a function that is decrypted as an encrypted code stream according to one of the embodiments disclosed herein. The integrity measurement code may invoke the MeasureCode instruction, which may be one of a "MeasureCode_Initialize", a "MeasureCode_Update", and a "MeasureCode_Finalize" instruction.

Figure 16B:
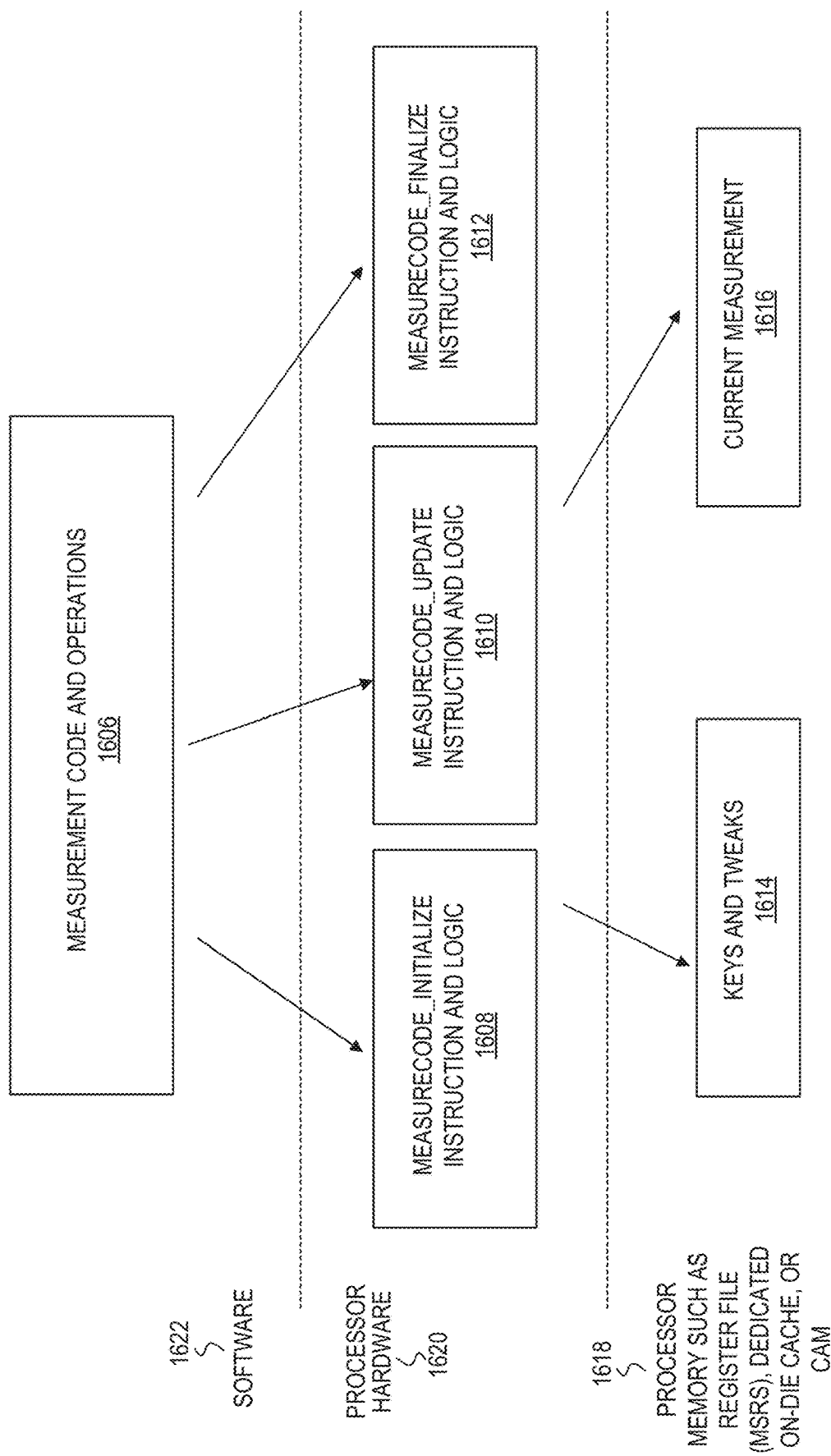
FIG. 16B is a block diagram illustrating example architecture for measuring the integrity of given code according to at least one embodiment.

With reference to FIG. 16B, an example of processor hardware 1620, software 1622, and processor memory 1618 (e.g., register file, dedicated on-die cache, CAM, etc.) for implementing the process 1600 of FIG. 16A are shown. In FIG. 16B, the hardware-software interaction between the integrity measurement code 1606 and the logic that implements the MeasureCode instructions, which can be MeasureCode_Initialize 1608, MeasureCode_Update 1610, and MeasureCode_Finalize 1612 instructions and logic, is illustrated. The integrity measurement code may initially invoke the MeasureCode_Initialize instruction. The MeasureCode_Initialize logic may access the keys and tweaks 1614, which are bound to the measurement or the CurrentMeasurement value 1616, both of which may be stored in processor memory 1618. Similarly, the integrity measurement code may invoke the MeasureCode_Update and MeasureCode_Finalize instructions and logic, and though these instructions, access the keys and tweaks 1614 and the CurrentMeasurement value 1616.

Example Architectures

Figure 17:
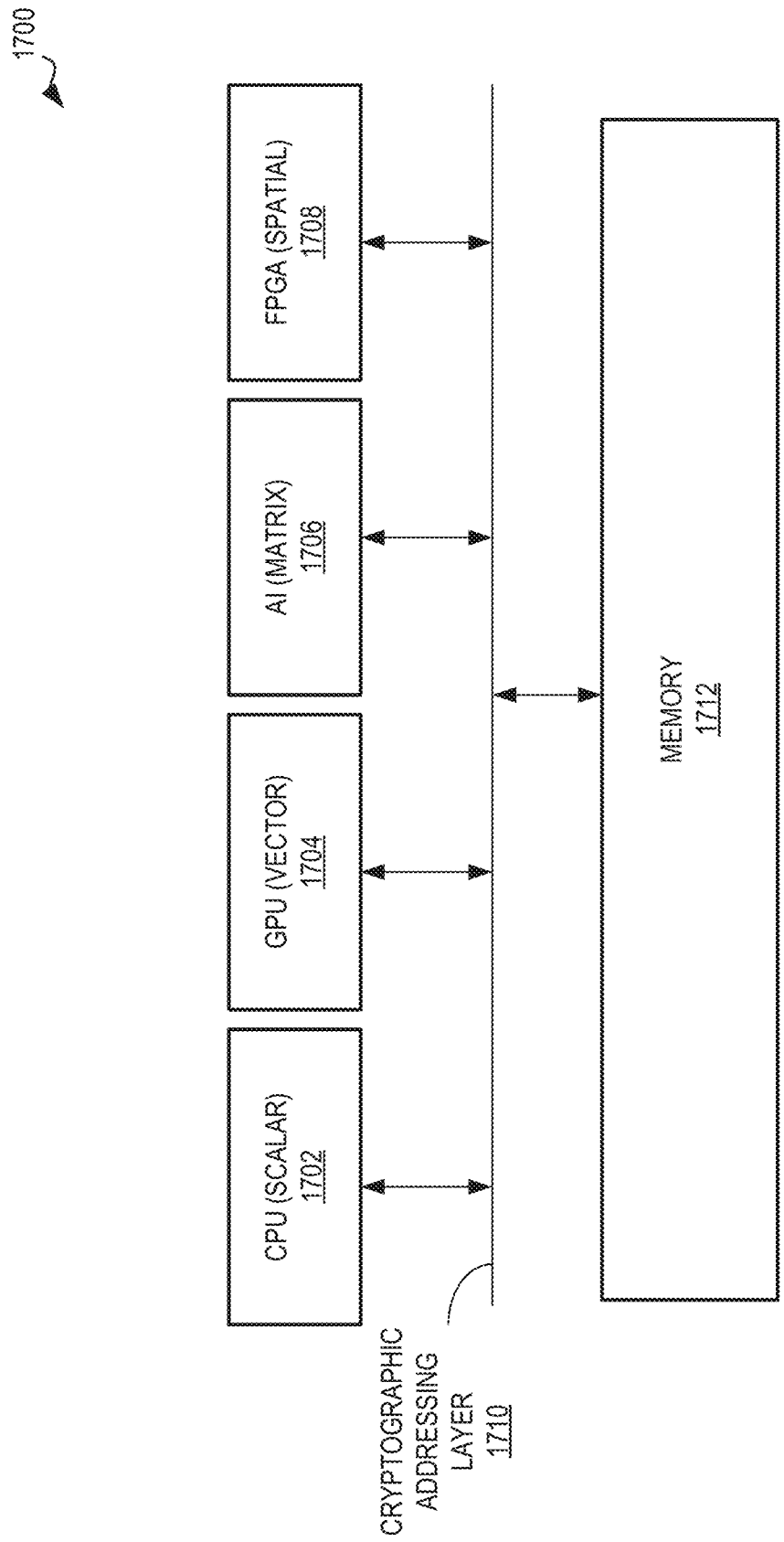
FIG. 17 is a block diagram illustrating an example cryptographic computing environment according to at least one embodiment.

FIG. 17 is a block diagram illustrating an example cryptographic computing environment 1700 according to at least one embodiment. In the example shown, a cryptographic addressing layer 1710 extends across the example compute vectors central processing unit (CPU) 1702, graphical processing unit (GPU) 1704, artificial intelligence (AI) 1706, and field programmable gate array (FPGA) 1708. For example, the CPU 1702 and GPU 1704 may share the same virtual address translation for data stored in memory 1712, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1712 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 18:
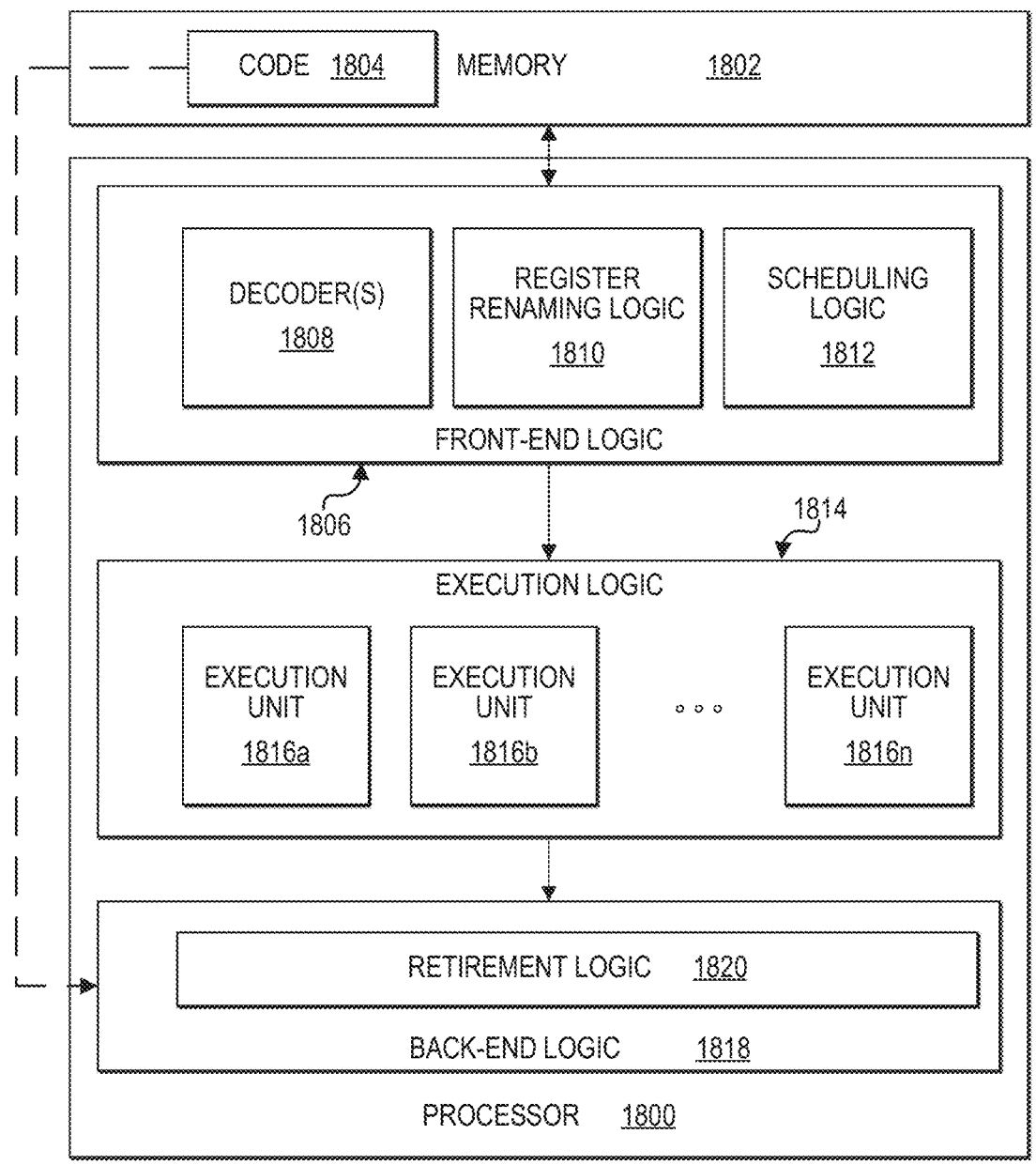
FIG. 18 is a block diagram illustrating an example processor core and memory according to at least one embodiment.
Figure 19:
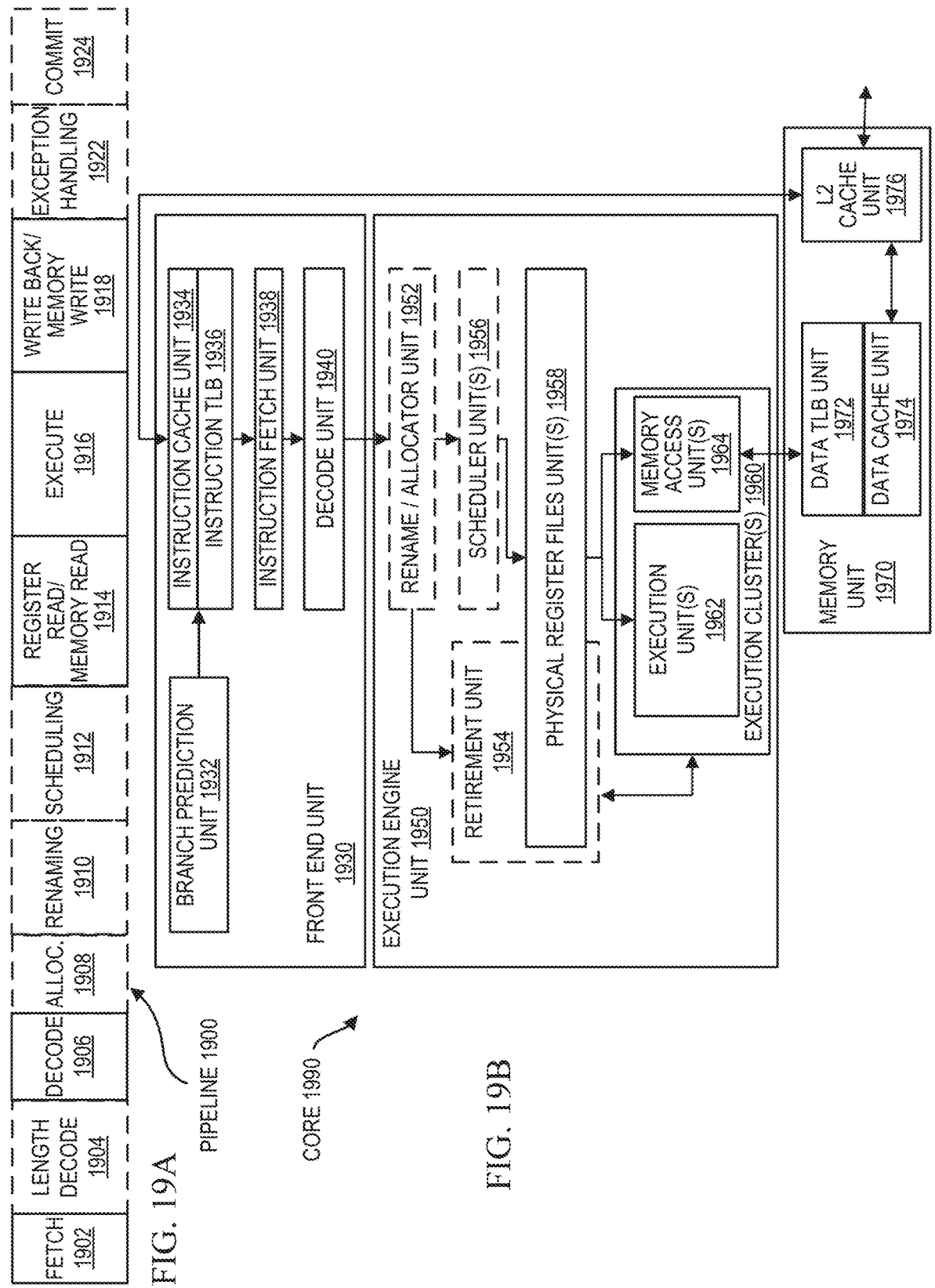
FIG. 19A is a block diagram illustrating both an exemplary in-order pipeline and an exemplary register renaming, out-of-order issue/execution pipeline in accordance with certain embodiments.
FIG. 19B is a block diagram illustrating both an exemplary embodiment of an in-order architecture core and an exemplary register renaming, out-of-order issue/execution architecture core to be included in a processor in accordance with certain embodiments.
Figure 20:
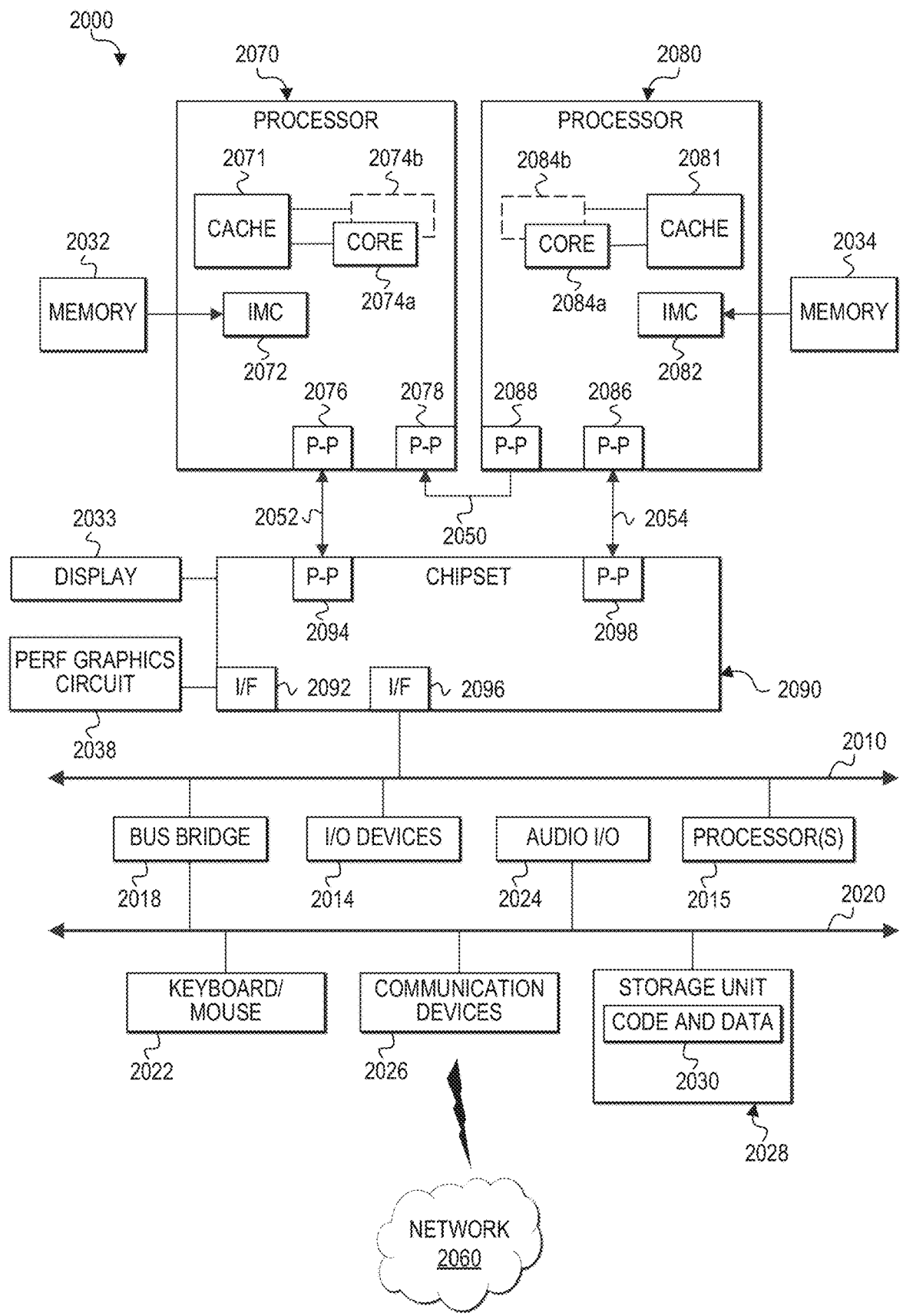
FIG. 20 is a block diagram of an example computer architecture according to at least one embodiment.

FIGS. 18-20 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 18-20.

FIG. 18 is an example illustration of a processor according to an embodiment. Processor 1800 is an example of a type of hardware device that can be used in connection with the implementations shown and described herein (e.g., processor 102). Processor 1800 may be any type of processor, such as a microprocessor, an embedded processor, a digital signal processor (DSP), a network processor, a multi-core processor, a single core processor, or other device to execute code. Although only one processor 1800 is illustrated in FIG. 18, a processing element may alternatively include more than one of processor 1800 illustrated in FIG. 18. Processor 1800 may be a single-threaded core or, for at least one embodiment, the processor 1800 may be multi-threaded in that it may include more than one hardware thread context (or "logical processor") per core.

FIG. 18 also illustrates a memory 1802 coupled to processor 1800 in accordance with an embodiment. Memory 1802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1800 can execute any type of instructions associated with algorithms, processes, or operations detailed herein. Generally, processor 1800 can transform an element or an article (e.g., data) from one state or thing to another state or thing.

Code 1804, which may be one or more instructions to be executed by processor 1800, may be stored in memory 1802, or may be stored in software, hardware, firmware, or any suitable combination thereof, or in any other internal or external component, device, element, or object where appropriate and based on particular needs. In one example, processor 1800 can follow a program sequence of instructions indicated by code 1804. Each instruction enters a front-end logic 1806 and is processed by one or more decoders 1808. The decoder may generate, as its output, a micro operation such as a fixed width micro operation in a predefined format, or may generate other instructions, microinstructions, or control signals that reflect the original code instruction. Front-end logic 1806 also includes register renaming logic 1810 and scheduling logic 1812, which generally allocate resources and queue the operation corresponding to the instruction for execution.

Processor 1800 can also include execution logic 1814 having a set of execution units 1816a, 1816b, 1816n, etc. Some embodiments may include a number of execution units dedicated to specific functions or sets of functions. Other embodiments may include only one execution unit or one execution unit that can perform a particular function. Execution logic 1814 performs the operations specified by code instructions.

After completion of execution of the operations specified by the code instructions, back-end logic 1818 can retire the instructions of code 1804. In one embodiment, processor 1800 allows out of order execution but requires in order retirement of instructions. Retirement logic 1820 may take a variety of known forms (e.g., re-order buffers or the like). In this manner, processor 1800 is transformed during execution of code 1804, at least in terms of the output generated by the decoder, hardware registers and tables utilized by register renaming logic 1810, and any registers (not shown) modified by execution logic 1814.

Although not shown in FIG. 18, a processing element may include other elements on a chip with processor 1800. For example, a processing element may include memory control logic along with processor 1800. The processing element may include I/O control logic and/or may include I/O control logic integrated with memory control logic. The processing element may also include one or more caches. In some embodiments, non-volatile memory (such as flash memory or fuses) may also be included on the chip with processor 1800.

FIG. 19A is a block diagram illustrating both an exemplary in-order pipeline and an exemplary register renaming, out-of-order issue/execution pipeline according to one or more embodiments of this disclosure. FIG. 19B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 19A-19B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 19A, a processor pipeline 1900 includes a fetch stage 1902, a length decode stage 1904, a decode stage 1906, an allocation stage 1908, a renaming stage 1910, a schedule (also known as a dispatch or issue) stage 1912, a register read/memory read stage 1914, an execute stage 1916, a write back/memory write stage 1918, an exception handling stage 1922, and a commit stage 1924.

FIG. 19B shows processor core 1990 including a front end unit 1930 coupled to an execution engine unit 1950, and both are coupled to a memory unit 1970. Processor core 1990 and memory unit 1970 are examples of the types of hardware that can be used in connection with the implementations shown and described herein (e.g., core 104, memory 120). The core 1990 may be a reduced instruction set computing (RISC) core, a complex instruction set computing (CISC) core, a very long instruction word (VLIW) core, or a hybrid or alternative core type. As yet another option, the core 1990 may be a special-purpose core, such as, for example, a network or communication core, compression engine, coprocessor core, general purpose computing graphics processing unit (GPGPU) core, graphics core, or the like. In addition, processor core 1990 and its components represent example architecture that could be used to implement logical processors and their respective components.

The front end unit 1930 includes a branch prediction unit 1932 coupled to an instruction cache unit 1934, which is coupled to an instruction translation lookaside buffer (TLB)

unit 1936, which is coupled to an instruction fetch unit 1938, which is coupled to a decode unit 1940. The decode unit 1940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1990 includes a microcode ROM or other medium that stores microcode for certain macroinstructions (e.g., in decode unit 1940 or otherwise within the front end unit 1930). The decode unit 1940 is coupled to a rename/allocator unit 1952 in the execution engine unit 1950.

The execution engine unit 1950 includes the rename/allocator unit 1952 coupled to a retirement unit 1954 and a set of one or more scheduler unit(s) 1956. The scheduler unit(s) 1956 represents any number of different schedulers, including reservations stations, central instruction window, etc. The scheduler unit(s) 1956 is coupled to the physical register file(s) unit(s) 1958. Each of the physical register file(s) units 1958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1958 comprises a vector registers unit, a write mask registers unit, and a scalar registers unit. These register units may provide architectural vector registers, vector mask registers, and general purpose registers (GPRs). In at least some embodiments described herein, register units 1958 are examples of the types of hardware that can be used in connection with the implementations shown and described herein (e.g., registers 112). The physical register file(s) unit(s) 1958 is overlapped by the retirement unit 1954 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1954 and the physical register file(s) unit(s) 1958 are coupled to the execution cluster(s) 1960. The execution cluster(s) 1960 includes a set of one or more execution units 1962 and a set of one or more memory access units 1964. The execution units 1962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1962 may also include an address generation unit (e.g., 822) to calculate addresses used by the core to access main memory (e.g., memory unit 1970) and a page miss handler (PMH) (e.g., 826).

The scheduler unit(s) 1956, physical register file(s) unit(s) 1958, and execution cluster(s) 1960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1964). It should also be understood that where separate pipelines are used, one or more of these pipelines may be out-of-order issue/execution and the rest in-order.

The set of memory access units 1964 is coupled to the memory unit 1970, which includes a data TLB unit 1972 coupled to a data cache unit 1974 coupled to a level 2 (L2) cache unit 1976. In one exemplary embodiment, the memory access units 1964 may include a load unit, a store address unit, and a store data unit, each of which is coupled to the data TLB unit 1972 in the memory unit 1970. The instruction cache unit 1934 is further coupled to a level 2 (L2) cache unit 1976 in the memory unit 1970. The L2 cache unit 1976 is coupled to one or more other levels of cache and eventually to a main memory. In addition, a page miss handler (e.g., page miss handler 826) may also be included in core 1990 to look up an address mapping in a page table if no match is found in the data TLB unit 1972.

By way of example, the exemplary register renaming, out-of-order issue/execution core architecture may implement the pipeline 1900 as follows: 1) the instruction fetch 1938 performs the fetch and length decoding stages 1902 and 1904; 2) the decode unit 1940 performs the decode stage 1906; 3) the rename/allocator unit 1952 performs the allocation stage 1908 and renaming stage 1910; 4) the scheduler unit(s) 1956 performs the schedule stage 1912; 5) the physical register file(s) unit(s) 1958 and the memory unit 1970 perform the register read/memory read stage 1914; the execution cluster 1960 perform the execute stage 1916; 6) the memory unit 1970 and the physical register file(s) unit(s) 1958 perform the write back/memory write stage 1918; 7) various units may be involved in the exception handling stage 1922; and 8) the retirement unit 1954 and the physical register file(s) unit(s) 1958 perform the commit stage 1924.

The core 1990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1934/1974 and a shared L2 cache unit 1976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 20 illustrates a computing system 2000 that is arranged in a point-to-point (PtP) configuration according to an embodiment. In particular, FIG. 20 shows a system where processors, memory, and input/output devices are interconnected by a number of point-to-point interfaces. Generally, one or more of the computing systems or computing devices described (e.g., computing device 100) herein may be configured in the same or similar manner as computing system 2000.

Processors 2070 and 2080 may be implemented as single core processors 2074a and 2084a or multi-core processors 2074a-2074b and 2084a-2084b. Processors 2070 and 2080 may each include a cache 2071 and 2081 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 2000. Moreover, processors 2070 and 2080 are examples of the types of hardware that can be used in connection with the implementations shown and described herein (e.g., processor 102).

Processors 2070 and 2080 may also each include integrated memory controller logic (MC) 2072 and 2082 to communicate with memory elements 2032 and 2034, which may be portions of main memory locally attached to the respective processors. In alternative embodiments, memory controller logic 2072 and 2082 may be discrete logic separate from processors 2070 and 2080. Memory elements 2032 and/or 2034 may store various data to be used by processors 2070 and 2080 in achieving operations and functionality outlined herein.

Processors 2070 and 2080 may be any type of processor, such as those discussed in connection with other figures. Processors 2070 and 2080 may exchange data via a point-to-point (PtP) interface 2050 using point-to-point interface circuits 2078 and 2088, respectively. Processors 2070 and 2080 may each exchange data with an input/output (I/O) subsystem 2090 via individual point-to-point interfaces 2052 and 2054 using point-to-point interface circuits 2076, 2086, 2094, and 2098. I/O subsystem 2090 may also exchange data with a high-performance graphics circuit 2038 via a high-performance graphics interface 2039, using an interface circuit 2092, which could be a PtP interface circuit. In one embodiment, the high-performance graphics circuit 2038 is a special-purpose processor, such as, for example, a high-throughput MIC processor, a network or communication processor, compression engine, graphics processor, GPGPU, embedded processor, or the like. I/O subsystem 2090 may also communicate with a display 2033 for displaying data that is viewable by a human user. In alternative embodiments, any or all of the PtP links illustrated in FIG. 20 could be implemented as a multi-drop bus rather than a PtP link.

I/O subsystem 2090 may be in communication with a bus 2020 via an interface circuit 2096. Bus 2010 may have one or more devices that communicate over it, such as a bus bridge 2018, I/O devices 2014, and one or more other processors 2015. Via a bus 2020, bus bridge 2018 may be in communication with other devices such as a user interface 2022 (such as a keyboard, mouse, touchscreen, or other input devices), communication devices 2026 (such as modems, network interface devices, or other types of communication devices that may communicate through a computer network 2060), audio I/O devices 2024, and/or a data storage device 2028. Data storage device 2028 may store code and data 2030, which may be executed by processors 2070 and/or 2080. In alternative embodiments, any portions of the bus architectures could be implemented with one or more PtP links.

Program code, such as code 2030, may be applied to input instructions to perform the functions described herein and generate output information. The output information may be applied to one or more output devices, in known fashion. For purposes of this application, a processing system may be part of computing system 2000 and includes any system that has a processor, such as, for example; a digital signal processor (DSP), a microcontroller, an application specific integrated circuit (ASIC), or a microprocessor.

The program code (e.g., 2030) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 20 is a schematic illustration of an embodiment of a computing system that may be utilized to implement various embodiments discussed herein. It will be appreciated that various components of the system depicted in FIG. 20 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
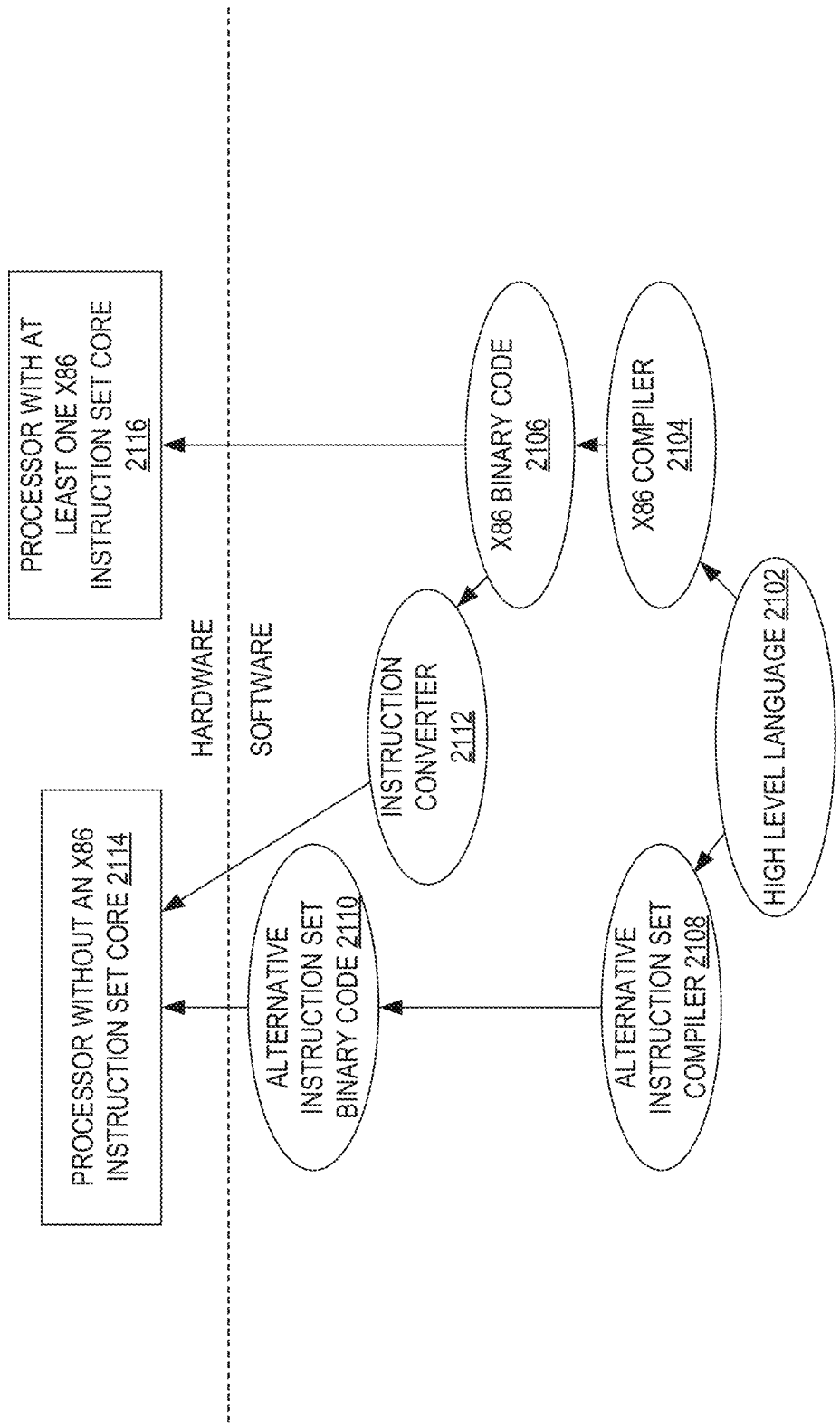
FIG. 21 is a block diagram contrasting the use of a software instruction converter to convert binary instructions in a source instruction set to binary instructions in a target instruction set according to embodiments of the present disclosure.

FIG. 21 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. The system, apparatus, method, and machine readable medium embodiments can include one or a combination of the following examples:

Example A1 provides an apparatus, a system, a processor, a machine readable medium, a method, and/or hardware-, firmware-, and/or software-based logic, where the Example of A1 includes a first memory unit including a plurality of memory compartment, and a core coupled to the first memory unit, the core including circuitry to execute a first instruction of a first software entity to: receive a first input operand indicating a first key associated with a first memory compartment of a plurality of memory compartments stored in a first memory unit; execute a cryptographic algorithm in a core of a processor to compute first encrypted contents based at least in part on the first key; and subsequent to computing the first encrypted contents in the core, store the first encrypted contents in the first memory compartment at a first memory location of the first memory unit.

In Example A2, the subject matter of Examples A1 can optionally include where the memory compartments of the plurality of memory compartments contain encrypted data or encrypted code of the first software entity.

In Example A3, the subject matter of Examples A2 can optionally include where the cryptographic algorithm is to be executed to compute the first encrypted contents based, in part, on a tweak.

In Example A4, the subject matter of any one of Examples A2-A3 can optionally include where the circuitry is to further execute a second instruction of the first software entity to: receive a second input operand indicating a second key associated with a second memory compartment of the plurality of memory compartments, execute the cryptographic algorithm in the core to compute second encrypted contents based at least in part on the second key, and subsequent to computing the second encrypted contents in the core, store the second encrypted contents at a second memory location in the second memory compartment of the first memory unit.

In Example A5, the subject matter of Example A4 can optionally include where the first software entity is one of a user application, a virtual machine, a function invoked by an application, or a thread of an application.

In Example A6, the subject matter of any one of Examples A1-A5 can optionally include where the first input operand contains a handle comprising one of an encrypted key, a first encoded pointer to a second memory location of the encrypted key in the first memory unit, or a second encoded pointer to a third memory location of the first key in a second memory unit in the processor, wherein to execute the first instruction of the first software entity is to further perform one of a second encryption algorithm to decrypt the encrypted key to compute the first key, an access to the second memory location of the first memory unit to obtain the encrypted key, or a different access to the third memory location of the second memory unit to obtain the first key.

In Example A7, the subject matter of Example A6 can optionally include where at least a portion of the second memory unit is one of a cache or a content addressable memory (CAM) unit inside the core of the processor.

In Example A8, the subject matter of any one of Examples A1-A6 can optionally include the processor further comprising a level one (L1) cache outside a boundary of the core, where to execute the first instruction of the first software entity is to further, prior to storing the first encrypted contents in the first memory compartment and subsequent to computing the first encrypted contents in the core, move the first encrypted contents into a level one (L1) cache outside a boundary of the core.

In Example A9, the subject matter of any one of Examples A1-A8 can optionally include, where the circuitry is to further, prior to executing the first instruction of the first software entity, execute a second instruction of the first software entity to receive a second input operand containing credentials of the first software entity, associate a context identifier with the credentials of the first software entity, and use the context identifier as an indicator that that the first software entity is executing.

In Example A10, the subject matter of any one of Examples A1-A9 can optionally include, where the circuitry is to further, prior to executing the first instruction of the first software entity, execute a second instruction of the first software entity to: receive a second input operand containing credentials of the first software entity; and based on determining that an indicator indicates that the first software entity is currently executing: obtain one of an encrypted key generated by encrypting the first key, a first encoded pointer to a second memory location of the encrypted key stored in the first memory unit, or a second encoded pointer to a third memory location of the first key stored in a second memory unit in the processor; and return to the first software entity one of a first handle containing the encrypted key, a second handle containing the first encoded pointer to the second memory location of the encrypted key stored in the first memory unit, or a third handle containing the second encoded pointer to the third memory location of the first key stored in the second memory unit of the processor.

In Example A11, the subject matter of Example A10 can optionally include where the second instruction of the first software entity is to further, responsive to obtaining the encrypted key, store the encrypted key in the second memory unit within the processor.

In Example A12, the subject matter of any one of Examples A1-A11 can optionally include, where the circuitry is to further, prior to executing the first instruction of the first software entity, execute a second instruction of the first software entity to generate the first key, encrypt the first key with a wrapping key to create a wrapped key, and store the wrapped key in the first memory unit or a register file.

In Example A13, the subject matter of Example A12 can optionally include where to execute the second instruction of the first software entity is to generate a cryptographically encoded pointer to the wrapped key, where a portion of the cryptographically encoded pointer is encrypted based at least in part on the wrapped key, and store the cryptographically encoded pointer in the first memory unit or in the register file.

In Example A14, the subject matter of any one of Examples A1-A13 can optionally include where the circuitry is to further execute a third instruction of a second software entity to receive an indication that subsequent legacy memory access instructions of the second software entity are to be executed in a cryptographic mode of operation, receive a third input operand indicating a second key to be used to perform cryptographic operations for the subsequent legacy memory access instructions, identify a first legacy memory access instruction, and perform a cryptographic operation in the core for the first legacy memory access instruction.

In Example A15, the subject matter of any one of Examples A1-A14 can optionally include where the circuitry is to further: execute a second instruction of the first software entity to receive one or more input operands indicating a starting address of a code stream and a length of the code stream, receive a third input operand indicating a second key to be used to decrypt instructions fetched from the code stream, and decrypt, in the core, one or more instructions fetched from the code stream based, at least in part, on the second key.

In Example A16, the subject matter of any one of Examples A14-A15 can optionally include where the circuitry is to further execute a second instruction of the first software entity to receive a second input operand indicating a first code segment in the first software entity, and receive a third input operand indicating a second key to be used by measurement operations to verify integrity of the first code segment, where the measurement operations are to be performed separately from the first software entity.

In Example A17, the subject matter of any one of Examples A1-A16 can optionally include where the circuitry is to further execute a fourth instruction of the first software entity to generate an encoded pointer to the memory location of the first memory compartment, where a linear address of the memory location is encoded in the encoded pointer.

In Example A18, the subject matter of Example A17 can optionally include where a portion of the linear address encoded in the encoded pointer is encrypted, and where the cryptographic algorithm is to be executed to compute the first encrypted contents based, in part, on a tweak derived from the encoded pointer In Example A19, the subject matter of Example A18 can optionally include where the tweak is to include plaintext address bits of the linear address encoded in the encoded pointer, an encrypted portion of the linear address encoded in the encoded pointer, or both the plaintext address bits of the linear address encoded in the encoded pointer and the encrypted portion of the linear address encoded in the encoded pointer.

In Example A20, the subject matter of any one of Examples A1-A19 can optionally include where the circuitry is to further execute a fourth instruction of the first software entity to receive a fourth input operand indicating the first key associated with the first memory compartment of the plurality of memory compartments, receive a fifth input operand indicating an encoded pointer to the memory location of the first memory compartment, move the first encrypted contents from the first memory compartment to the core, execute the cryptographic algorithm in the core on the first encrypted contents to compute first decrypted contents based at least in part on the first key, and subsequent to computing the first decrypted contents in the core, make the first decrypted contents available to the first software entity.

In Example A21, the subject matter of any one of Examples A1-A20 can optionally include where the circuitry is to further decode, by a decoder unit, the first instruction into a decoded format, where an execution of the first instruction is performed by an execution unit based on the decoded format of the first instruction.

Example B1 provides an apparatus, a system, a processor, a machine readable medium, a method, and/or hardware-, firmware-, and/or software-based logic, where the Example of B1 includes An Example Y1 provides an apparatus, the apparatus comprising means for performing the method of any one of the Examples A1 through A20 above.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples A1 through A20 above.

In Example Y4, the subject matter of any one of Examples Y1-Y3 can optionally include that the apparatus is one of a computing system or a system-on-a-chip.

An Example X1 provides at least one machine readable medium comprising instructions, where the instructions when executed realize an apparatus, realize a system, or implement a method in any one of the preceding Examples A1 through A20 above.

What is claimed is:
1. A processor, comprising:
a core to be coupled to a first memory, the core including circuitry to:
decode a first instruction of a software entity, the first instruction to declare a code stream of the software entity as being encrypted and having a starting address and a length, the first instruction to include one or more input operands indicating the starting address of the code stream of the software entity and the length of the code stream, the first instruction to further include a second input operand indicating a first key;
execute the decoded first instruction to:
obtain, based on the one or more input operands, the starting address of the code stream and the length of the code stream; and
obtain the first key based on the second input operand, wherein one or more encrypted instructions fetched from the code stream subsequent to the code stream being declared by the first instruction are to be decrypted using a first cryptographic algorithm and the first key; and
identify a last encrypted instruction in the code stream based on the starting address and the length of the code stream declared by the first instruction.

2. The processor of claim 1, wherein the software entity is one of a user application, a virtual machine, a function invoked by an application, or a thread of the application.

3. The processor of claim 1, wherein the circuitry is further to:
execute, within the core of the processor, the first cryptographic algorithm to compute a first decrypted instruction by decrypting a first encrypted instruction of the code stream based, at least in part, on the first key.

4. The processor of claim 3, wherein the first cryptographic algorithm is to be executed based, in part, on a tweak, and wherein the tweak is to be derived from an encoded pointer to the first encrypted instruction.

5. The processor of claim 1, wherein one of the one or more input operands in the first instruction includes a cryptographically encoded pointer to the starting address of the code stream.

6. The processor of claim 1, wherein the circuitry is further to:
decode a second instruction of the software entity, the second instruction to include a third input operand indicating a specifier for a code segment corresponding to the code stream in the software entity and a fourth input operand indicating a second key; and
execute the decoded second instruction of the software entity to:
obtain the specifier for the code segment from the third input operand; and
obtain the second key based on the fourth input operand, the second key to be used by one or more measurement operations to verify integrity of the code segment.

7. The processor of claim 6, wherein the circuitry is further to:
execute at least the decoded second instruction of the software entity to:
generate a current measurement of the code segment using a second cryptographic algorithm and the second key;
compare the current measurement with an expected measurement; and
allow the code segment to be executed based on determining that the current measurement matches the expected measurement.

8. The processor of claim 7, wherein the specifier is associated with the starting address of the code segment and an ending address of the code segment.

9. The processor of claim 1, wherein the second input operand contains an encrypted code key, a handle comprising a wrapped code key, a first encoded pointer to the encrypted code key in the first memory, or a second encoded pointer to the first key in a processor memory.

10. The processor of claim 9, wherein the circuitry is further to:
perform a third cryptographic algorithm to decrypt the encrypted code key to obtain the first key or to decrypt the wrapped code key to obtain the first key.

11. The processor of claim 9, wherein the handle further comprises an address key to decrypt a cryptographically encoded pointer to one of the one or more encrypted instructions in the code stream.

12. The processor of claim 9, wherein the handle further comprises a tweak to be used with the first key and the first cryptographic algorithm to decrypt at least one encrypted instruction in the code stream.

13. The processor of claim 1, wherein the circuitry is further to:
prior to executing the decoded first instruction of the software entity, execute a decoded third instruction of the software entity to:
obtain a fifth input operand containing one or more credentials of the software entity;
associate a context identifier with the one or more credentials of the software entity; and
use the context identifier as an indicator that the software entity is executing.

14. A system, comprising:
a first memory; and
a processor including a core coupled to the first memory, the core including circuitry to:
decode a first instruction of a software entity stored in the first memory, the first instruction to declare a code stream of the software entity as being encrypted and having a starting address and a length, the first instruction to include a first input operand indicating the starting address of the code stream of the software entity, a second input operand indicating the length of the code stream, and a third input operand indicating a first key;
execute the decoded first instruction to:
obtain, based on the first input operand, the starting address of the code stream;
obtain, based on the second input operand, the length of the code stream; and
obtain the first key based on the third input operand; and
decrypt one or more encrypted instructions fetched from the code stream using a first cryptographic algorithm and the first key, wherein a last encrypted instruction in the code stream is to be identified based on the starting address and the length of the code stream declared by the first instruction.

15. The system of claim 14, wherein the software entity is one of a user application, a virtual machine, a function invoked by an application, or a thread of the application.

16. The system of claim 14, wherein the circuitry is further to:
execute, within the core, the first cryptographic algorithm to compute a first decrypted instruction by decrypting a first encrypted instruction of the code stream based, at least in part, on the first key.

17. The system of claim 14, wherein the circuitry is further to:
decode a second instruction of the software entity, the second instruction to include a fourth input operand indicating a specifier for a code segment corresponding to the code stream in the software entity and a fifth input operand indicating a second key; and
execute the decoded second instruction of the software entity to:
obtain the specifier for the code segment from the fourth input operand; and
obtain the second key based on the fifth input operand, the second key to be used by one or more measurement operations to verify integrity of the code segment.

18. The system of claim 17, wherein the circuitry is further to:
execute at least the decoded second instruction of the software entity to:
generate a current measurement of the code segment using a second cryptographic algorithm and the second key;

compare the current measurement with an expected measurement; and allow the code segment to be executed based on determining that the current measurement matches the expected measurement.

19. One or more machine readable media comprising instructions that when executed by a core of processor, cause the core to perform operations comprising:

decoding a first instruction of a software entity, the first instruction to declare a code stream of the software entity as being encrypted and having a starting address and a length, the first instruction to include one or more input operands indicating a starting address of the code stream of the software entity and the length of the code stream;

executing the decoded first instruction to obtain, based on the one or more input operands, the starting address of the code stream and the length of the code stream;

decoding a second instruction, the second instruction to include a second input operand indicating a first key;

executing the decoded second instruction to obtain the first key based on the second input operand, wherein one or more encrypted instructions fetched from the code stream subsequent to the code stream being declared by the first instruction are to be decrypted using a first cryptographic algorithm and the first key; and identifying a last encrypted instruction in the code stream based on the starting address and the length of the code stream declared by the first instruction.

20. The one or more machine readable media of claim 19, wherein the first cryptographic algorithm is to be executed within the core of the processor.

21. The one or more machine readable media of claim 19, wherein the second input operand is to contain an encrypted code key, a handle comprising a wrapped code key, a first encoded pointer to the encrypted code key in a first memory, or a second encoded pointer to the first key in a processor memory.

22. A method comprising:

decoding a first instruction by decoder circuitry of a core of a processor, the first instruction declaring a code stream of a software entity as being encrypted and having a starting address and a length, the first instruction including one or more input operands indicating the starting address of the code stream of the software entity in memory and the length of the code stream;

executing, by execution circuitry, the decoded first instruction to obtain the starting address of the code stream and the length of the code stream;

decoding a second instruction, the second instruction including a second input operand indicating a first key;

executing the decoded second instruction to obtain the first key;

decrypting, within the core of the processor, one or more encrypted instructions fetched from the code stream subsequent to the code stream being declared by the first instruction, wherein the decrypting includes using a first cryptographic algorithm and the first key; and identifying a last encrypted instruction in the code stream based on the starting address and the length of the code stream declared by the first instruction.

23. The method of claim 22, further comprising:

executing, within the core of the processor, the first cryptographic algorithm to compute a first decrypted instruction by decrypting a first encrypted instruction of the code stream based, at least in part, on the first key.

\* \* \* \* \*